United States Patent
Funahashi

(10) Patent No.: US 11,607,728 B2
(45) Date of Patent: Mar. 21, 2023

(54) METHOD FOR MANUFACTURING SINTERED BODY, STRUCTURE, AND COMPOSITE STRUCTURE

(71) Applicant: Murata Manufacturing Co., Ltd., Nagaokakyo (JP)

(72) Inventor: Shuichi Funahashi, Nagaokakyo (JP)

(73) Assignee: MURATA MANUFACTURING CO., LTD., Nagaokakyo (JP)

(*) Notice: Subject to any disclaimer, the term of this patent is extended or adjusted under 35 U.S.C. 154(b) by 290 days.

(21) Appl. No.: 16/726,295

(22) Filed: Dec. 24, 2019

(65) Prior Publication Data
US 2020/0139441 A1 May 7, 2020

Related U.S. Application Data

(63) Continuation of application No. PCT/JP2018/025322, filed on Jul. 4, 2018, and a continuation of application No. PCT/JP2017/024719, filed on Jul. 5, 2017.

(51) Int. Cl.
| | | |
|---|---|---|
| *B22F 7/00* | (2006.01) | |
| *B32B 18/00* | (2006.01) | |
| *B22F 7/02* | (2006.01) | |
| *B22F 1/10* | (2022.01) | |
| *B22F 1/142* | (2022.01) | |
| *C04B 35/645* | (2006.01) | |
| *C04B 35/26* | (2006.01) | |
| *C04B 35/01* | (2006.01) | |
| *B22F 7/04* | (2006.01) | |

(52) U.S. Cl.
CPC ................ *B22F 7/008* (2013.01); *B22F 1/10* (2022.01); *B22F 1/142* (2022.01); *B22F 7/02* (2013.01); *B32B 18/00* (2013.01); *C04B 35/016* (2013.01); *C04B 35/26* (2013.01); *C04B 35/645* (2013.01); *B22F 2007/042* (2013.01); *C04B 2235/3268* (2013.01); *C04B 2235/3274* (2013.01); *C04B 2235/40* (2013.01); *C04B 2235/422* (2013.01); *C04B 2235/44* (2013.01); *C04B 2235/5472* (2013.01); *C04B 2235/763* (2013.01)

(58) Field of Classification Search
CPC ..... C04B 35/26; C04B 35/645; C04B 35/016; C04B 2235/3208; C04B 2235/3274; C04B 2235/40; C04B 2235/422; C04B 2235/44; C04B 2235/5472; C04B 2235/763

See application file for complete search history.

(56) References Cited

U.S. PATENT DOCUMENTS

| | | | |
|---|---|---|---|
| 3,474,426 A | 10/1969 | Bean et al. | |
| 4,808,326 A * | 2/1989 | Tanino | H01F 1/37 428/407 |
| 4,830,840 A | 5/1989 | Bhattacharyya | |
| 6,579,818 B2 | 6/2003 | Kawai et al. | |
| 6,623,878 B1 | 9/2003 | Takenaka | |
| 2002/0094456 A1 | 7/2002 | Noguchi et al. | |
| 2002/0094929 A1 | 7/2002 | Kawai et al. | |
| 2003/0148024 A1 | 8/2003 | Kodas et al. | |
| 2010/0303731 A1 | 12/2010 | Hyde et al. | |
| 2017/0088471 A1 | 3/2017 | Randall et al. | |

FOREIGN PATENT DOCUMENTS

| | | |
|---|---|---|
| EP | 0225392 A1 | 6/1987 |
| JP | S486604 B1 | 2/1973 |
| JP | S63291640 A | 11/1988 |
| JP | H03164472 A | 7/1991 |
| JP | H0692724 A | 4/1994 |
| JP | H06215924 A | 8/1994 |
| JP | H07232926 A | 9/1995 |
| JP | H10144513 A | 5/1998 |
| JP | H10324565 A | 12/1998 |
| JP | H116817 A | 1/1999 |
| JP | 2000264719 A | 9/2000 |
| JP | 2001106566 A | 4/2001 |
| JP | 2007039276 A | 2/2007 |
| JP | 2010173873 A | 8/2010 |
| JP | 2011225446 A | 11/2011 |
| JP | 2012212853 A | 11/2012 |
| JP | 2014130773 A | 7/2014 |

OTHER PUBLICATIONS

Japanese Office Action issued for JP Application No. 2019-527740, dated Jun. 8, 2021.
Preparation and gas sensing properties for acetone of amorphous Ag modified NiFe2O4 sensor; Jiao Wan-li, Zhang Lei; Trans. Nonferrous Met. Soc. China 22(2012) 1127-1132; Available on line at www.sciencedirect.com (Year: 2012).
Mesh | Size, Micron Comparison chart I Kramer Industries Inc I NJ, NH; (https://www.kramerindustriesonline.com/) (Year: 2021).
Magnetic Ferrites for High-Frequency Uses; Frank G. Brockman; Full text of a conference paper presented at the AIEE Winter General Meeting, New York, N. Y., Jan. 31-Feb. 4, 1949.pp. 1077-1080 published Dec. 1949 (Year: 1949).
International Search Report issued in PCT/JP2018/025322, dated Oct. 2, 2018.
Written Opinion of the International Searching Authority issued in PCT/JP2018/025322, dated Oct. 2, 2018.
International Search Report issued in PCT/JP2017/024719, dated Sep. 12, 2017.
Written Opinion of the International Searching Authority issued in PCT/JP2017/024719, dated Sep. 12, 2017.

* cited by examiner

*Primary Examiner* — C Melissa Koslow
(74) *Attorney, Agent, or Firm* — ArentFox Schiff LLP

(57) ABSTRACT

A method for manufacturing a sintered body, the method including heating a mixture that contains a plurality of particles of a metal oxide having a spinel-type structure, and a metal acetylacetonate under pressure at a temperature of from a melting point or higher of the metal acetylacetonate to 600° C. or lower, to form a sintered body that contains the metal oxide having the spinel-type structure.

8 Claims, 10 Drawing Sheets

METHOD FOR MANUFACTURING SINTERED BODY, STRUCTURE, AND COMPOSITE STRUCTURE

CROSS REFERENCE TO RELATED APPLICATIONS

The present application is a continuation of International application No. PCT/JP2018/025322, filed Jul. 4, 2018, and a continuation of International application No. PCT/JP2017/024719, filed Jul. 5, 2017, the entire contents of each of which are incorporated herein by reference.

FIELD OF THE INVENTION

The present invention relates to a method for manufacturing a sintered body, in more detail to a method for manufacturing a sintered body that contains a metal oxide having a spinel-type structure. The present invention further relates to a structure manufactured by the method and a composite structure including the structure.

BACKGROUND OF THE INVENTION

It is known that many oxides can have their material characteristics such as strength, thermal conductivity, and electric conductivity improved by attaining high density through the sintering of oxide particles. Conventionally, a sintering temperature of 800° C. or higher has been required for sintering the oxide particles to produce a high-density sintered body. Such high-temperature sintering, however, has a problem such as high costs for a considerably high temperature required. Therefore, there is a need to achieve a high density by sintering the oxide particles at a lower temperature.

Patent Document 1 discloses a method for mixing particles of an oxide with a solvent (water and an acid or an alkali) that can partially dissolve the oxide, and heating and pressing the mixture at 200° C. or lower to form a sintered body having a density of 85% or more of a theoretical density.

Patent Document 1: US 2017/0088471 A

SUMMARY OF THE INVENTION

Patent Document 1 discloses a high-density sintered body that is attainable by sintering particles of a metal oxide having, for example, a perovskite-type structure and a wurtzite-type structure at a low temperature, but does not specifically discloses a high-density sintered body that is attainable by sintering particles of a metal oxide having a spinel-type structure at a low temperature. The metal oxide having the spinel-type structure is very useful as a material used for, for example, a temperature sensor or an electrode of a lithium ion battery. Therefore, further desired is a high-density sintered body achieved by low-temperature sintering of the metal oxide having the spinel-type structure.

The present invention has been made in view of the above problem, and an object of the present invention is to provide a method for manufacturing a sintered body that is a new method capable of manufacturing, by low-temperature sintering, a comparatively high-density sintered body that contains a metal oxide having a spinel-type structure. Further, an object of the present invention is to provide a high-density and high-strength structure manufactured by the method, and a composite structure that is formed by joining the structure and a base material together with a high-adhesion-strength joining layer and that is less likely to cause peeling.

According to a first aspect of the present invention, there is provided a method for manufacturing a sintered body that contains a metal oxide having a spinel-type structure, the method including: mixing a plurality of particles of at least one metal oxide having a spinel-type structure with at least one metal acetylacetonate to produce a mixture; and heating the mixture under pressure at a temperature of from a melting point or higher of the metal acetylacetonate to 600° C. or lower.

In one embodiment of the first aspect of the present invention, the mixture can be heated in presence of a fluid.

In one embodiment of the first aspect of the present invention, the fluid can be mixed in the mixture.

In one embodiment of the first aspect of the present invention, the metal acetylacetonate can contain a metal element that is the same as at least one metal element contained in the metal oxide.

In one embodiment of the first aspect of the present invention, the metal oxide can contain at least two metals, the metal acetylacetonate can be at least two metal acetylacetonates, and the at least two metal acetylacetonates can have a metal-based mole ratio corresponding to a stoichiometric ratio of the at least two metals contained in the metal oxide.

In one embodiment of the first aspect of the present invention, the mixture can further contain at least one of a metal material, a resin material, or a carbon material.

In one embodiment of the first aspect of the present invention, the metal oxide can be ferrite.

In one embodiment of the first aspect of the present invention, the metal oxide can contain Ni and Mn.

According to a second aspect of the present invention, there is provided a structure containing a first plurality of particles of a metal oxide having a spinel-type structure; and an amorphous phase interposed among the first plurality of particles of the metal oxide, the amorphous phase containing at least one metal element.

In one embodiment of the second aspect of the present invention, the at least one metal element can be a metal element that is the same as at least one metal element contained in the metal oxide.

In one embodiment of the second aspect of the present invention, the structure can further contain a second plurality of particles of a metal oxide having a spinel-type structure, the second plurality of particles of the metal oxide can have a smaller particle size than a particle size of the first plurality of particles of the metal oxide, the second plurality of particles of the metal oxide can be present so as to surround each one of the first plurality of particles of the metal oxide, and the amorphous phase can be interposed between the first plurality of particles of the metal oxide and the second plurality of particles of the metal oxide.

In one embodiment of the second aspect of the present invention, the structure can further contain a plurality of particles of at least one of a metal material, a resin material, and a carbon material, and the amorphous phase can be interposed between the first plurality of particles of the metal oxide and the plurality of particles of the at least one of the metal material, the resin material, and the carbon material.

In one embodiment of the second aspect of the present invention, the metal oxide can be ferrite.

In one embodiment of the second aspect of the present invention, the metal oxide can contain Ni and Mn.

According to a third aspect of the present invention, there is provided a composite structure including: a base material containing at least one of a metal material, a resin material, and a carbon material; the structure according to the second aspect; and a joining layer between the base material and the structure. The joining layer contains the first plurality of particles of the metal oxide, an element that is the same as at least one element contained in the base material, and the amorphous phase interposed among the first plurality of particles of the metal oxide.

In one embodiment of the third aspect of the present invention, the amorphous phase of the joining layer can contain a metal element that is the same as at least one metal element contained in the metal oxide.

In one embodiment of the third aspect of the present invention, the base material can contain at least one of a polyimide or polyethylene terephthalate.

According to the present invention, there is provided a method for manufacturing a sintered body that is a new method capable of manufacturing, by low-temperature sintering, a comparatively high-density sintered body that contains a metal oxide having a spinel-type structure. Further, according to the present invention, there is provided a high-density and high-strength structure manufactured by the method, and a composite structure that is formed by joining the structure and a base material together with a high-adhesion-strength joining layer and that is less likely to cause peeling.

DETAILED DESCRIPTION OF THE INVENTION

Figure 1:
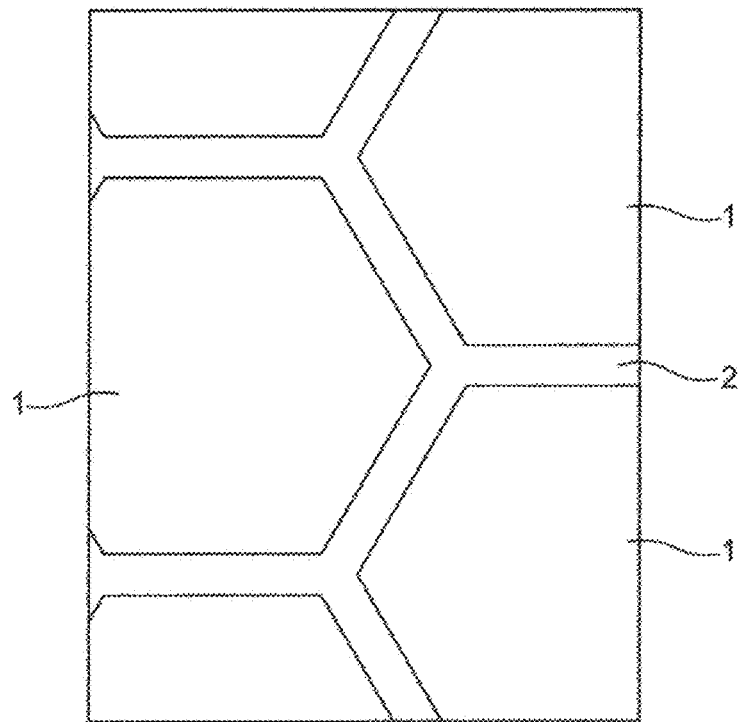
FIG. 1 is a schematic diagram illustrating a configuration of a sintered body manufactured according to the present invention.

In the present invention, a sintered body that contains a metal oxide having a spinel-type structure is formed by heating a mixture (hereinafter, also referred to as a "raw material mixture") that contains a plurality of particles of a metal oxide having a spinel-type structure, and a metal acetylacetonate under pressure at a temperature of from a melting point or higher of the metal acetylacetonate to 600° C. or lower. The method according to the present invention is capable of forming a high-density sintered body.

In the present invention, the "sintered body" refers to an object obtained by heating the raw material mixture containing the plurality of particles of the metal oxide at lower than a melting point of the metal oxide constituting the particles (when at least two metal oxides are contained, the temperature is lower than a melting point of the metal oxide having the lowest melting point of the at least two metal oxides). In the present specification, such an object obtained as a result of the method is also referred to as a "structure." A shape of the sintered body is not particularly limited, and may be film-shaped or bulk-shaped. A film-shaped sintered body may be a thick film having a film thickness of 10 μm or more, may be a thin film having a film thickness of less than 10 μm, or may be an ultra thin film having a film thickness of 10 nm or less.

In the present specification, it is possible to use, as the metal oxide having the spinel-type structure, any metal oxide as long as the metal oxide has the spinel-type structure. Preferably, the metal oxide contains one or more of Li, Mg, Al, Cr, Mn, Fe, Co, Ni, Cu, and Zn. Specifically, it is possible to use a metal oxide represented by the general formula $AB_2O_4$. In the general formula, A can mean one or more metal elements positioned at an A site of the spinel-type structure, and B can mean one or more metal elements positioned at a B site of the spinel-type structure. Typically, A and B are each one or more metal elements independently selected from the group including Li, Mg, Al, Cr, Mn, Fe, Co, Ni, Cu, and Zn. For example, it is possible to use, as the metal oxide having the spinel-type structure, metal oxides having stoichiometric compositions such as $Zn_{0.5}Ni_{0.5}Fe_2O_4$, $NiMn_2O_4$ (MNO), and $LiNi_{0.5}Mn_{1.5}O_4$ (LNMO). The metal oxide having the spinel-type structure, however, is not limited to these examples. The plurality of particles of the metal oxide having the spinel-type structure have an average particle size of, for example, 0.01 μm to 100 μm, preferably 0.02 μm to 1 μm. As the metal oxide having the spinel-type structure, particles of at least two metal oxides may be used, or particles of a metal oxide having different average particle sizes may be used. When the plurality of particles of the metal oxide having the spinel-type structure have an average particle size in the range of 0.01 μm to 100 μm, a solvent that has been heated and pressed easily transports particles of the metal oxide to gaps among other particles of the metal oxide, so that a high-density sintered body is more effectively achievable. The average particle size in the present invention is a particle size (D50) that is a point reaching a cumulative value of 50% in a cumulative curve obtained by determining a volume particle size distribution and setting the entire volume as 100%. It is possible to measure such an average particle size using a laser diffraction/scattering particle size/grains size distribution analyzer or an electron scanning microscope.

In the present specification, the metal acetylacetonate is an acetylacetonate salt of a metal, in more detail a chelate complex having a bidentate ligand, i.e., an acetylacetonate ion (($CH_3COCHCOCH_3$)$^-$, hereinafter also expressed as the abbreviation (acac)$^-$) and a central metal. In the present invention, a metal contained in the metal acetylacetonate can be any appropriate metal. The metal is preferably a metal element that is the same as at least one metal element contained in the metal oxide. The sintered body obtained by the present invention includes, as described below with reference to FIG. 1, a plurality of particles of the metal oxide and an amorphous phase containing a substance derived from the metal acetylacetonate. When the metal contained in the metal acetylacetonate is a metal element that is the same as at least one metal element contained in the metal oxide, phases of the sintered body come to have compositions including a common metal element, so that it is possible to further suppress degradation of the characteristics of the sintered body even when interdiffusion occurs between the particles of the metal oxide and the amorphous phase.

As the metal acetylacetonate, one metal acetylacetonate may be used, or at least two metal acetylacetonates may be used in combination. For example, when the metal oxide contains at least two metals as represented by the general formula $AB_2O_4$, it is preferable to use a metal acetylacetonate containing A and a metal acetylacetonate containing B. It is further preferable to set a mole ratio between the metal acetylacetonate containing A and the metal acetylacetonate containing B at 1:2. This allows the plurality of particles of the metal oxide and the amorphous phase containing a substance derived from the metal acetylacetonates to have compositions including same metal elements, so that it is possible to further suppress degradation of the characteristics of the sintered body even when interdiffusion occurs between the particles of the metal oxide and the amorphous phase.

Mixing the plurality of particles of the metal oxide having the spinel-type structure with the metal acetylacetonate gives a raw material mixture. It is possible to mix the plurality of particles of the metal oxide having the spinel-type structure with the metal acetylacetonate in an atmosphere at normal temperature and humidity and at atmospheric pressure. The metal acetylacetonate may be, for example, mixed at a ratio of 0.1 wt % to 50 wt %, and is mixed at a ratio of preferably 1 wt % to 30 wt %, more preferably 2 wt % to 10 wt %, relative to the total weight of the plurality of particles of the metal oxide having the spinel-type structure.

The metal acetylacetonate to be mixed may be in any state. For example, the raw material mixture may be obtained by mixing the plurality of particles of the metal oxide having the spinel-type structure with a dry powdery solid metal acetylacetonate. In this case, the plurality of particles of the metal oxide having the spinel-type structure are mixed with the powdery metal acetylacetonate by a general mixing method to give the raw material mixture, with the general mixing method performed, for example, at atmospheric pressure, in a solvent containing one or two or more selected from the group consisting of, for example, water and acetylacetone or in a gas containing one or two or more selected from the group consisting of, for example, air and nitrogen.

The raw material mixture may also be obtained by mixing the plurality of particles of the metal oxide having the spinel-type structure, the metal acetylacetonate, and a solvent. As the solvent, it is possible to use any appropriate solvent, and the solvent may be a mixture of one or two or more selected from the group consisting of, for example, water and acetylacetone. The amount of the solvent is acceptable if it is suitable and not excessively large for heating the raw material mixture under pressure, and the amount is not particularly limited. The solvent can be mixed at a ratio of, for example, 50 wt % or less, preferably 30 wt % or less, relative to the total weight of the particles of the metal oxide having the spinel-type structure. In the mixing, the metal acetylacetonate and the solvent may be used separately, or a liquid material obtained by diffusing or dissolving the metal acetylacetonate in the solvent may be used. In cases of the latter, a liquid material used for synthesizing the metal acetylacetonate may be used without separating the metal acetylacetonate from the liquid material. In more detail, it is possible to synthesize the metal acetylacetonate by mixing liquid acetylacetone with a metal compound (for example, a hydroxide or a chloride of a metal), and to use the liquid material after the synthesis by direct use or by adding a solvent as necessary.

It is possible to form a comparatively high-density sintered body by heating the raw material mixture obtained as described above under pressure at a temperature of from a melting point or higher of the metal acetylacetonate to 600° C. or lower. This heating step liquefies the metal acetylacetonate and enables the metal acetylacetonate to function as the solvent. The heating is preferably performed in presence of a fluid. The fluid in the present specification is, for example, a liquid, preferably a liquid that can be used as the solvent, more preferably water. For example, presence of water during heating and pressing the raw material mixture causes water to be present in interfaces of the particles of the metal oxide having the spinel structure that are contained in the raw material mixture. This phenomenon enables the raw material mixture to be sintered at a lower temperature and is capable of effectively improving the strength of the sintered body.

In the present specification, the state where the mixture is in presence of water does not necessarily refer to positive addition of water to the mixture, and water only has to be slightly present in the interfaces of the particles of the metal oxide. The degree of water presence may also be that the particles of the metal oxide only absorb moisture at room temperature. The positive addition of water may be performed by making the raw material mixture contain water (mixing) or by heating and pressing the raw material mixture in a water vapor atmosphere. Particularly, when water is present by being mixed in the raw material mixture, it is possible to more effectively spread water to the interface of each particle of an oxide powder. When water is mixed in the raw material mixture, the amount of water is not particularly limited, and may be, for example, 20 wt % or less, and is preferably 15 wt % or less, typically 10 wt %, relative to the total weight of the particles of the metal oxide having the spinel-type structure. With water mixed in the raw material mixture in an amount of 20 wt % or less, it is possible to mix water in the raw material mixture and more effectively prevent the raw material mixture from lowering its moldability. In order to effectively achieve an improvement in the strength of the sintered body, it is preferable to use as much water as possible within the above range, specifically water in an amount of 10 wt % to 20 wt %. On the other hand, in order to further facilitate the molding, it is preferable to use as less water as possible within the above range, specifically water in an amount of more than 0 wt % to 10 wt %.

The pressure to be applied to the raw material mixture may be, for example, 1 MPa to 5000 MPa, and is preferably 5 MPa to 1000 MPa, more preferably 10 MPa to 500 MPa. In the present specification, the pressing the raw material mixture means application of pressing force (or physical/mechanical pressure) to the raw material mixture (in more detail, a sold component contained in the raw material mixture) using, for example, a pressure molding device. Therefore, it is to be noted that a liquid component contained in the raw material mixture is, even in a state where the raw material mixture is pressed, exposed to pressure of a surrounding atmosphere (usually, atmospheric pressure).

A temperature for heating the raw material mixture (hereinafter, also referred to as a "heating temperature" in the present specification) means a firing temperature and only has to be a temperature of from a melting point or higher of the metal acetylacetonate contained in the raw material mixture to 600° C. or lower. In the present specification, the melting point refers to a temperature measured at room temperature and atmospheric pressure by a measuring method defined in JIS standards. In the meantime, each melting point usually changes according to various conditions such as pressure during pressing. Table 1 below shows the melting points of various metal acetylacetonates.

When at least two metal acetylacetonates are used, "the melting point of the metal acetylacetonate" refers to the highest melting point among the melting points of all the metal acetylacetonates. The heating temperature of the raw material mixture depends on, for example, the metal oxide used, but may be a temperature of 5° C. or more higher than the melting point of the metal acetylacetonate and 600° C. or lower, and is, for example, 100° C. or higher and 600° C. or lower, preferably 100° C. or higher and 400° C. or lower, more preferably 100° C. or higher and 300° C. or lower.

TABLE 1

| Substance | Melting point (° C.) |
|---|---|
| Zinc acetylacetonate | 130 |
| Manganese acetylacetonate | 161 |
| Iron acetylacetonate | 185 |
| Nickel acetylacetonate | 230 |
| Lithium acetylacetonate | 250 |

Such heating of the raw material mixture under pressure at a temperature of the melting point or higher of the metal acetylacetonate enables formation of a comparatively high-density sintered body at 600° C. or lower, a lower temperature than in a conventional method. In the present specification, the comparatively high density refers to the fact that a ratio of the density to the theoretical density of the thus obtained sintered body is higher than a ratio of the density to the theoretical density of a sintered body obtained by heating and pressing only the particles of the metal oxide having the spinel-type structure that are contained in the raw material mixture (without presence of the metal acetylacetonate) under the same temperature and pressure conditions. The sintered body obtained by the present invention only has to be comparatively highly-density. The ratio of the density to the theoretical density of the sintered body depends on, for example, the composition of the particles of the metal oxide used, but can be, for example, 70% or more, preferably 80% or more. It is convenient to consider that the metal oxide that is contained in the obtained sintered body and has the spinel-type structure is substantially the same as the metal oxide of the plurality of particles of the metal oxide having the spinel-type structure that are contained in the raw material mixture. A time for heating and pressing the raw material mixture can be appropriately selected, but is preferably 10 minutes to 120 minutes.

The sintered body obtained with use of the raw material mixture that contains the plurality of particles of the metal oxide having the spinel-type structure, and the metal acetylacetonate is, without limiting the present invention, considered to have, as illustrated in FIG. 1, a configuration that includes particles 1 of the metal oxide having the spinel-type structure, and an amorphous phase 2. The characteristics of the sintered body mainly depend on the characteristics of the particles 1 of the metal oxide having the spinel-type structure and further on the density of the sintered body. The amorphous phase 2 containing a substance derived from the metal acetylacetonate plays a role of an adhesive layer to enable the sintered body to attain further high density and high strength. FIG. 1 illustrates only substantially the same size particles, but the particles of the metal oxide having the spinel-type structure that are contained in the sintered body do not necessarily have to be a uniform size.

In short, a structure according to one embodiment of the present invention contains a first plurality of particles of a metal oxide having a spinel-type structure; and an amorphous phase interposed among the first plurality of particles of the metal oxide, the amorphous phase containing at least one metal element. The at least one metal element can be a metal element derived from at least one of the first plurality of particles of the metal oxide having the spinel-type structure or a metal acetylacetonate. Such a structure allows the amorphous phase to play a role of an adhesive layer as described above, so that the structure has a high-density and a high-strength. The at least one metal element can be a metal element that is the same as at least one metal element contained in the metal oxide having the spinel-type structure. In this case, the first particles of the metal oxide of the structure and the amorphous phase come to contain at least one common metal element as described above, so that it is possible to suppress degradation of the characteristics of the structure even when interdiffusion occurs between the first particles of the metal oxide and the amorphous phase.

In the present specification, the amorphous phase means a phase having substantially no crystalline property or having comparatively low crystallinity, and this is identifiable while discerned from particles having a crystal structure, on the basis of an electron diffraction image that is a method known to those skilled in the art. A specific identification method is described in the EXAMPLES section below.

The raw material mixture may further contain any appropriate material in addition to the plurality of particles of the metal oxide having the spinel-type structure, and the metal acetylacetonate. In more detail, the raw material mixture may further contain an additive such as a pH adjuster, a sintering additive, or a pressure release agent. These additives may be, for example, mixed at a ratio of 0.01 wt % to 10 wt %, and are mixed at a ratio of preferably 0.01 wt % to 1 wt %, more preferably 0.01 wt % to 0.1 wt %, relative to the total weight of the particles of the metal oxide having the spinel-type structure.

In one embodiment of the present invention, the raw material mixture may further contain at least one of a metal material, a resin material, or a carbon material (hereinafter, also referred to as a "composite material" in the present specification) in addition to the plurality of particles of the metal oxide having the spinel-type structure, and the metal acetylacetonate. In the present embodiment, the heating temperature of the raw material mixture is a temperature from a melting point or higher of the metal acetylacetonate to 600° C. or lower. When the lowest melting point or transformation temperature of the metal oxide having the spinel-type structure and the composite material that are contained in the raw material mixture is lower than 600° C., the heating temperature may be a temperature lower than the lowest melting point or transformation temperature. The transformation temperature is a temperature at which a metal material is transformed by oxidation when the raw material mixture contains the metal material as the composite material. The heating temperature is, for example, 100° C. to 500° C., preferably 100° C. to 400° C., more preferably 100° C. to 300° C. In the present embodiment, the raw material mixture containing the metal acetylacetonate is capable of forming a sintered body at a temperature of 600° C. or lower as described above (when the composite material has a melting point or transformation temperature lower than 600° C., at a temperature lower than the melting point or the transformation temperature of the composite material). Therefore, the present embodiment is capable of forming a sintered body by combining, through sintering, the composite material with the particles of the metal oxide having the spinel-type structure without decomposing the composite material, whereas the composite material has been unusable in the conventional method because the conventional method requires a sintering temperature of 800° C. or higher for producing a high-density sintered body by sintering oxide particles and such a high temperature decomposes the composite material.

Figure 2:
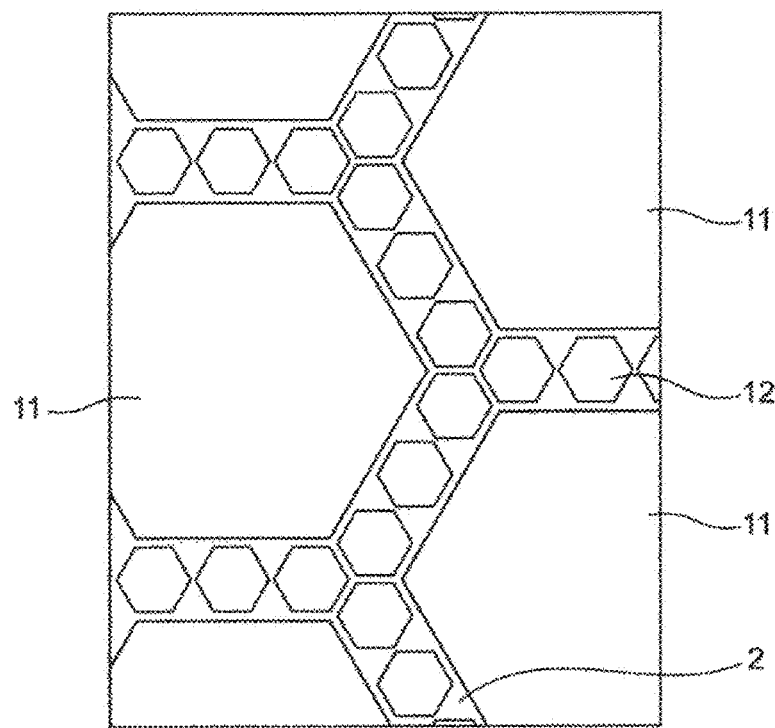
FIG. 2 is a schematic diagram illustrating a configuration of a sintered body manufactured according to the present invention.

As regards the sintered body obtained with use of the metal oxide that has different average particle sizes and the spinel-type structure, and the sintered body obtained with use of the raw material mixture further containing at least one (composite material) of a metal material, a resin material, or a carbon material in addition to the plurality of particles of the metal oxide having the spinel-type structure, and the metal acetylacetonate, when the composite material remains in the form of particles in the sintered body, the sintered body can, without limiting the present invention, be considered to have, as illustrated in FIG. 2, a configuration including several types of plural particles and the amorphous phase 2. The characteristics of the sintered body depend on the characteristics of the plurality of types of particles, further on the density of the sintered body. The amorphous phase 2 containing a substance derived from the metal acetylacetonate plays a role of an adhesive layer to enable the sintered body to attain further high density. The size of the particles contained in the sintered body does not necessarily have to be uniform. For example, as the particles contained in the sintered body, large particles 11 having a large average particle size and small particles 12 having a small average particle size may be contained as illustrated in FIG. 2. Alternatively, particles having at least three sizes may be contained.

In short, when the sintered body is manufactured with use of the metal oxide that has different particle sizes and the spinel-type structure, a structure according to one embodiment of the present invention can further contain a second plurality of particles of a metal oxide having a spinel-type structure, with the second plurality of particles of the metal oxide having a smaller particle size than a particle size of the first plurality of particles of the metal oxide, and with the second plurality of particles (small particles smaller than the first particles in terms of the particle size) of the metal oxide being possibly present so as to surround each one (large particle) of the first plurality of particles (large particles larger than the second particles in terms of the particle size) of the metal oxide. The amorphous phase can be interposed between the first plurality of particles (large particles) of the metal oxide and the second plurality of particles (small particles) of the metal oxide. In the present specification, the phrase "the second particles (or small particles) surround each one (large particle) of the first particles (or large particles)" is not necessarily a state where the second particles surround the first particles with completely well-ordered uniform disposition. Specifically, a state is acceptable where the second plurality of particles (or small particles) are disposed so as to be flowed into the amorphous phase interposed among the first particles (or large particles). Such surrounding peripheries of the large particles with the plurality of particles having a smaller particle size than the large particles allows the amorphous phase to be more finely interposed among the particles, resulting in the amorphous phase that effectively plays a role of an adhesive layer. Therefore, such a structure can be a further high-density and high-strength structure. The particle size in the present specification is an equivalent circle diameter of a particle calculated using image analysis software, and is specifically to be an equivalent circle diameter calculated from an area of a particle measured by the image analysis software "Azo-kun (registered trademark)" manufactured by Asahi Kasei Engineering Corporation.

In cases of the structure according to the embodiment described above, the second plurality of particles (small particles) of the metal oxide having the spinel-type structure and the first plurality of particles (large particles) of the metal oxide may have various differences as long as the particles satisfy the condition of small and large particle sizes, the positioning conditions among the particles, and the interposition conditions of the amorphous phase. For example, the second particles (small particles) and the first particles (large particles) may be different in at least one of, for example, the composition of the metal oxide (or the type of metal contained), or the shape of the particles. Further, neither the second plurality of particles (small particles) nor the first plurality of particles (large particles) necessarily have to be uniform in terms of at least one of the particle size, the composition of the metal oxide (or the type of metal contained), or the shape of the particles as long as the second particles (small particles) and the first particles (large particles) satisfy the conditions described above.

When the sintered body is manufactured with use of the raw material mixture further containing at least one (composite material) of a metal material, a resin material, or a carbon material, and the at least one of the metal material, the resin material, or the carbon material is in the form of particles, a structure according to one embodiment of the present invention can further contain a plurality of particles of the at least one of the metal material, the resin material, or the carbon material and can allow the amorphous phase to be interposed between the first plurality of particles of the metal oxide and the plurality of particles of the at least one of the metal material, the resin material, or the carbon material.

When the metal material, the resin material, and/or the carbon material is in the form of particles, the particles of each material have an average particles size of, for example, 0.001 μm to 1000 μm, preferably 0.01 μm to 100 μm.

In the present specification, the metal material means a material that can contain a pure metal formed of a single metal element, an alloy formed of a plurality of metal elements, and a metal-containing material (for example, a magnetic material) formed of a metal element and a non-metal element. In the above embodiment, examples of the metal material that can be used for the raw material mixture include metallic magnetic materials having a crystal structure, such as Si or Cr-containing Fe, and metallic magnetic materials having an amorphous crystal. For example, a metallic magnetic material is mixed in the raw material mixture, and a composite is, as described above, formed by bonding the large particles 11 of a metallic magnetic body to each other with the amorphous phase 2 that contains the small particles 12 of the metal oxide having the spinel-type structure, to give the composite having much more excellent magnetic permeability than a conventional composite formed by bonding particles of a metallic magnetic body to each other with a resin. These metal materials may be, for example, mixed at a ratio of 50 wt % to 99 wt %, and is mixed at a ratio of preferably 80 wt % to 99 wt %, more preferably 90 wt % to 99 wt %, relative to the total weight of the particles of the metal oxide having the spinel-type structure. The raw material mixture containing the metal material at the above ratio enables an increase in proportion of the metal material contained in the sintered body formed and an effective improvement in the magnetic permeability of the sintered body.

In short, a structure according to one embodiment of the present invention is a sintered body manufactured with use of the raw material mixture containing a plurality of particles of the metal material, can further contain a plurality of particles of the metal material, and can allow the amorphous phase to be interposed between the first plurality of particles of the metal oxide having the spinel-type structure and the plurality of particles of the metal material.

When the raw material mixture contains the metal material in the form of particles, the plurality of particles of the metal material preferably have a larger average particle size than the average particle size of the plurality of particles of the metal oxide having the spinel-type structure. That is, in FIG. 2 illustrating the configuration of the sintered body formed, the particles of the metal oxide having the spinel-type structure are preferably the small particles 12, and the metal material is preferably the large particles 11 that are larger than the small particles 12. Generally, coverage of surfaces of electrically conductive metal particles with particles of an oxide enables an increase in electrical insulation among the electrically conductive metal particles. Therefore, due to the metal material that has a larger average particle size than the average particle size of the plurality of particles of the metal oxide having the spinel-type structure, it is possible to effectively cover a surface of the metal material in the form of particles with the particles of the oxide as illustrated in FIG. 2 and thus to more effectively achieve the insulation among the metal particles.

Further, when the metal material is in the form of particles having a larger average particle size than the average particle size of the plurality of particles of the metal oxide having the spinel-type structure, most of the particles of the metal oxide having the spinel-type structure are disposed within the amorphous phase 2 as illustrated in FIG. 2. Coverage of a periphery of the metal oxide having the spinel-type structure with the amorphous phase 2 containing a substance derived from the metal acetylacetonate enables the formed sintered body to effectively exert the characteristics derived from the metal oxide having the spinel-type structure, compared to cases where the periphery of the metal oxide having the spinel-type structure is covered with, for example, voids.

In short, a structure according to one embodiment of the present invention can further contain a plurality of particles of the metal material, with the plurality of particles of the metal material having a larger particle size than the particle size of the first plurality of particles of the metal oxide having the spinel-type structure, and with the first plurality of particles (small particles smaller than the particles of the metal material in terms of the particle size) of the metal oxide being possibly present so as to surround each one (large particle) of the plurality of particles (large particles larger than the first particles in terms of the particles size) of the metal material. The amorphous phase can be interposed between the plurality of particles (large particles) of the metal material and the first plurality of particles (small particles) of the metal oxide having the spinel-type structure.

In the present specification, the resin material means a material that can contain a natural resin and a synthetic resin. In the above embodiment, examples of the resin material that can be contained in the raw material mixture include a polyimide, an epoxy resin, PET (polyethylene terephthalate), and a urethane resin. For example, sintering, with the resin material, an NTC thermistor material that is utilized for application to, for example, a thermometer and is the particles of the metal oxide having the spinel-type structure enables formation of a functional membrane that is usable as a thermometer and is flexible. Such a resin material may be, for example, mixed at a ratio of 0.01 wt % to 99 wt %, and is mixed at a ratio of preferably 0.01 wt % to 50 wt %, more preferably 0.01 wt % to 10 wt %, relative to the total weight of the particles of the metal oxide having the spinel-type structure. The raw material mixture containing the resin material at the above ratio is capable of effectively improving the adhesiveness between the sintered body and a base material (substrate) having the sintered body formed thereon and is capable of imparting more excellent flexibility to the sintered body. An embodiment of forming the sintered body on the base material (substrate) is described later in detail.

In short, a structure according to one embodiment of the present invention is a sintered body manufactured with use of the raw material mixture containing a plurality of particles of the resin material, can further contain a plurality of particles of the resin material, and can allow the amorphous phase to be interposed between the first plurality of particles of the metal oxide having the spinel-type structure and the plurality of particles of the resin material.

When the raw material mixture contains the resin material in the form of particles, the plurality of particles of the resin material preferably have a larger average particle size than the average particle size of the plurality of particles of the metal oxide having the spinel-type structure. That is, in FIG. 2 illustrating the configuration of the sintered body formed, the particles of the metal oxide having the spinel-type structure are preferably the small particles 12, and the resin material is preferably the large particles 11 that are larger than the small particles 12. Due to the resin material that has a larger average particle size than the average particle size of the plurality of particles of the metal oxide having the spinel-type structure, peripheries of the large particles 11 made of the resin material that can have more excellent flexibility than the metal oxide are covered with the small particles 11 of the metal oxide and the amorphous phase 2 to form a three-dimensional network, allowing the formed sintered body to have excellent flexibility and effectively exert more excellent flexibility along with a decrease in thickness of a layer.

In short, a structure according to one embodiment of the present invention can further contain a plurality of particles of the resin material, with the plurality of particles of the resin material having a larger particle size than the particle size of the first plurality of particles of the metal oxide having the spinel-type structure, and with the first plurality of particles (small particles smaller than the particles of the resin material in terms of the particle size) of the metal oxide being possibly present so as to surround each one (large particle) of the plurality of particles (large particles larger than the first particles in terms of the particles size) of the resin material. The amorphous phase can be interposed between the plurality of particles (large particles) of the resin material and the first plurality of particles (small particles) of the metal oxide having the spinel-type structure.

In the present specification, the carbon material means a material formed of only carbon (for example, carbon and graphite) or a material that can contain a carbon-containing material having a carbon content of 10% by mass or more. In the above embodiment, examples of the carbon material that can be contained in the raw material mixture include a carbon powder, a carbon nanotube, a carbon nanowire, a carbon nanoribbon, a fullerene, graphene, and metallic carbide. The raw material mixture containing these carbon materials is capable of improving electrical and/or thermal characteristics of the sintered body formed. These carbon materials may be, for example, mixed at a ratio of 0.01 wt % to 50 wt %, and is mixed at a ratio of preferably 0.01 wt % to 10 wt %, more preferably 0.01 wt % to 5 wt %, relative to the total weight of the plurality of particles of the metal oxide having the spinel-type structure. The raw material mixture containing the carbon material at the above ratio is capable of more effectively improving the electrical and/or thermal characteristics of the sintered body formed.

In short, a structure according to one embodiment of the present invention is a sintered body manufactured with use of the raw material mixture containing a plurality of particles of the carbon material, can further contain a plurality of particles of the carbon material, and can allow the amorphous phase to be interposed between the first plurality of particles of the metal oxide having the spinel-type structure and the plurality of particles of the carbon material.

When the raw material mixture contains the carbon material in the form of particles, the plurality of particles of the carbon material preferably have a smaller average particle size than the average particle size of the plurality of particles of the metal oxide having the spinel-type structure. That is, in FIG. 2 illustrating the configuration of the sintered body formed, the particles of the metal oxide having the spinel-type structure are preferably the large particles 11, and the carbon material is preferably the small particles 12 that are smaller than the large particles 11. Due to the carbon material having a smaller average particle size than the average particle size of the plurality of particles of the metal oxide having the spinel-type structure, the small particles 12 of the carbon material that can have more excellent electrical characteristics and/or thermal conductivity than the metal oxide promote formation of joining excellent in electrical and/or thermal characteristics between the large particles 11 of the metal oxide and the amorphous phase 2 to be capable of effectively improving the electrical and/or thermal characteristics of the sintered body formed.

In conclusion, a structure according to one embodiment of the present invention can further contain a plurality of particles of the carbon material, with the plurality of particles of the carbon material having a smaller particle size than the particle size of the first plurality of particles of the metal oxide having the spinel-type structure, and the plurality of particles (small particles smaller than the first particles in terms of the particle size) of the carbon material being possibly present so as to surround each one (large particle) of the first plurality of particles (large particles larger than the particles of the carbon material in terms of the particles size) of the metal oxide. The amorphous phase can be interposed between the plurality of particles (small particles) of the carbon material and the first plurality of particles (large particles) of the metal oxide having the spinel-type structure.

In another embodiment of the present invention, there is provided a composite structure, specifically a structure obtained by forming a sintered body on a base material. The composite structure includes the base material, the structure according to any embodiment described above, and a joining layer positioned between the base material and the structure. The joining layer contains a first plurality of particles of a metal oxide having a spinel-type structure, an element same as at least one element contained in the base material, and an amorphous phase interposed among the first plurality of particles of the metal oxide. It is possible to confirm, using a scanning transmission electron microscope (STEM), the element that is contained in the joining layer and is same as the at least one element contained in the base material.

In order to manufacture the composite structure, a first plurality of particles of a metal oxide having a spinel-type structure are mixed with a metal acetylacetonate by the method described above while a solvent is added and mixed with the mixture as necessary, to give a raw material mixture that has not yet been sintered (or has not yet been pressure-heated). Next, the raw material mixture is applied (for example, application or printing (screen printing or the like)) to a base material by a method known to those skilled in the art, such as coating, dipping, laminating, or spraying. The base material having the raw material mixture applied thereto is subjected to a treatment such as drying under heating or natural drying as necessary, and thereafter heated by, for example, means known to those skilled in the art, such as a pressing machine, under pressure at a temperature of a melting point or higher of the metal acetylacetonate and 600° C. or lower. Through these steps, the composite structure is manufactured. Except the application of the raw material mixture to the base material midway through the manufacturing process, the detailed conditions and the like of the other steps are the same as in the method for manufacturing a sintered body described above.

Due to such a manufacturing method, the boundaries are not always clearly set between the base material and the joining layer and between the joining layer and the structure of the composite structure. For example, the joining layer can be formed so as to make gradation between the base material and the structure. Examples of the gradation include gradation that includes the first particles of the metal oxide more in a position close to the structure than in a position close to the base material, and gradation including the element same as the at least one element contained in the base material more in a position close to the base material than in a position close to the structure. The first plurality of particles of the metal oxide contained in the joining layer are derived from the first plurality of particles of the metal oxide in the raw material mixture that has not yet been sintered. The amorphous phase contained in the joining layer is derived from the metal acetylacetonate in the raw material mixture that has not yet been sintered. Therefore, the amorphous phase contained in the joining layer can also contain at least one metal element. The at least one metal element can be a metal element derived from at least one of the first plurality of particles of the metal oxide having the spinel-type structure or the metal acetylacetonate in the raw material mixture that has not yet been sintered. According to, for example, the composition of the raw material mixture that has not yet been sintered, changeable are, for example, the shape, the disposition, and the size of the first plurality of particles contained in the structure and the joining layer of the composite structure, as well as second particles, particles of a metal material, particles of a resin material, and particles of a carbon material that are present in some cases. Further, the joining layer portion and the structure portion of the composite structure are not always the same in the shape, the disposition, and the size of the first plurality of particles of the metal oxide, as well as second particles, particles of a metal material, particles of a resin material, and particles of a carbon material that are present in some cases, as well as a substance (or element) contained in the amorphous phase and an interposed position of the amorphous phase.

The composite structure including the joining layer sandwiched between the structure and the base material attains strong adhesion strength between the structure (sintered body) and the base material to be less likely to cause peeling. The joining layer contains the first plurality of particles of the metal oxide that are diffused by a pressure heating step and are derived from the raw material mixture, the element derived from the base material, and the amorphous phase interposed among the first plurality of particles. The composite structure that includes the sintered body having strong adhesion strength to the base material enables suitable use for a wide range of applications where the sintered body can be used by being formed on a base material and brought into close contact with the base material. The amorphous phase of the joining layer is preferable when the at least one metal element that can be contained in the amorphous phase includes a metal element same as at least one metal element contained in the metal oxide having the spinel-type structure, because such a case also gives the joining layer the characteristics of the metal oxide having the spinel-type structure.

As the base material, any material with any shape may be acceptable as long as the material allows the application of the raw material mixture. Examples of the shape of the base material include a rectangular shape, a rectangular parallelepiped shape, a polygonal shape, and a cylindrical shape, but the shape is not particularly limited.

Figure 6:
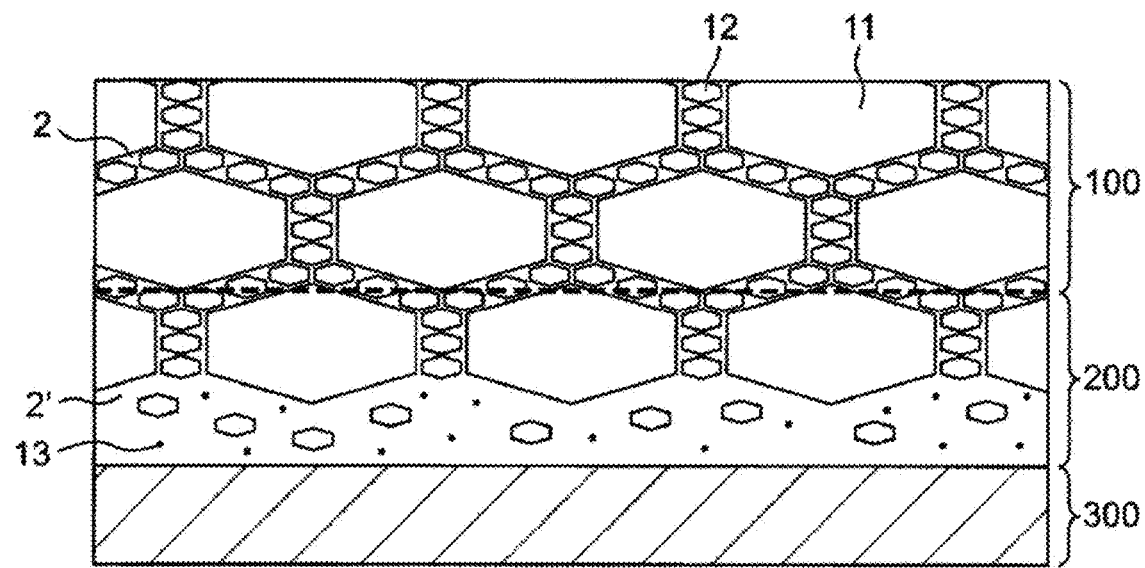
FIG. 6 is a schematic diagram illustrating one example of a configuration of a composite structure according to the present invention.

FIG. 6 is a schematic diagram illustrating one example of a configuration of a composite structure according to the present invention. In FIG. 6, the composite structure is configured to include a structure (sintered body) 100, a joining layer 200, and a base material 300. FIG. 6, however, is no more than a schematic diagram, and the boundaries are not always clearly set as described above between the structure 100 and the joining layer 200 and between the joining layer 200 and the base material 300.

In the example illustrated in FIG. 6, the second plurality of particles (small particles 12) of the metal oxide having the spinel-type structure are, in the structure 100, as described above in FIG. 2, present so as to surround each large particle 11 of the first plurality of particles (large particles 11) of the metal oxide having the spinel-type structure, with the amorphous phase 2 interposed between the plurality of large particles 11 and the plurality of small particles 12. In the same manner as described above in FIG. 2, the amorphous phase 2 is derived from the metal acetylacetonate and contains at least one metal element (not shown).

The joining layer 200 includes the plurality of large particles 11, the plurality of small particles 12, a base material element 13 (an element same as at least one element contained in the base material 300), and an amorphous phase 2' of the joining layer 200 interposed between the plurality of large particles 11 and the plurality of small particles 12. As illustrated in FIG. 6, the disposition of the plurality of large particles 11 and the plurality of small particles 12 in the joining layer 200 may be different from the disposition of the plurality of large particles 11 and the plurality of small particles 12 in the structure 100, and may also be, for example, irregular disposition. The base material element 13 may be present at any position in the joining layer 200, may be, for example, present so as to allow interposition of the amorphous phase 2' of the joining layer 200 in the same manner as the plurality of particles (for example, at least one of the large particles 11 or the small particles 12) of the metal oxide do, or may be present so as to be attached to the plurality of large particles 11 and the plurality of small particles 12 of the metal oxide.

The base material 300 can contain at least one of a metal material, a resin material, or a carbon material. Particularly, the base material 300 can contain the resin material. The resin material can contain particularly at least one of a polyimide or polyethylene terephthalate, more particularly a polyimide. Further, in an embodiment, the base material 300 containing the resin material, particularly the base material 300 containing the polyimide can further contain an element, particularly a metal element same as at least one element contained in the metal oxide in the plurality of particles (for example, at least one of the large particles 11 or the small particles 12) of the metal oxide having the spinel-type structure that are contained in the structure 100 (and the joining layer 200). In conclusion, an element, particularly a metal element derived from the metal oxide contained in the raw material mixture is diffused into as far as the base material 300 by pressure heating. Thus, the element derived from the metal oxide is diffused into as far as the base material 300 to make stronger adhesion strength between the structure 100 and the base material 300 and thus make peeling further less likely to be caused. Further, the base material 300 containing the resin material enables the composite structure to have suitable flexibility.

In one embodiment of the present invention, the metal oxide having the spinel-type structure may be ferrite. That is, in one embodiment of the present invention, the particles of the metal oxide having the spinel-type structure that are contained in the raw material mixture and the metal oxide that is contained in the sintered body (structure) obtained and has the spinel-type structure are spinel-type ferrite. The ferrite in the present specification is a magnetic material containing ferric oxide, and the spinel-type ferrite is a magnetic material that contains ferric oxide having a spinel-type structure and includes, for example, ferrite represented by the composition formula $AFe_2O_4$ and ferrite represented by $B_xC_{1-x}Fe_2O_4$. In the embodiment, the A, B, and C may each be any metal of, for example, Mn, Co, Ni, Cu, Zn, Li, Fe, and Mg, and are each preferably Ni, Zn, Fe, Mn, Co, or Li. The spinel-type ferrite is utilized for various items such as a core material of various inductors. The method for manufacturing a sintered body according to the present embodiment is capable of giving a sintered body containing the spinel-type ferrite, and such a manufacturing method can be suitably utilized for manufacturing various items containing the ferrite.

In one embodiment of the present invention, the metal oxide having the spinel-type structure may contain Ni and Mn. Examples of the metal oxide having the spinel-type structure and containing Ni and Mn include metal oxides having stoichiometric compositions such as $NiMn_2O_4$ (MNO) and $LiNi_{0.5}Mn_{1.5}O_4$ (LNMO). Such a metal oxide is utilized for various items such as an NTC thermistor material (for example, $NiMn_2O_4$) and a positive electrode material (for example, $LiNi_{0.5}Mn_{1.5}O_4$) of a lithium ion battery. The method for manufacturing a sintered body according to the present embodiment is capable of giving a sintered body that contains the metal oxide having the spinel-type structure and containing Ni and Mn, and such a manufacturing method can be suitably utilized for manufacturing various items containing such a metal oxide.

EXAMPLES

Examples 1

With reference to Example 1-1 in Table 2, in a mortar were put 0.5 g of particles of a metal oxide having the composition $Zn_{0.5}Ni_{0.5}Fe_2O_4$ as the plurality of particles of the metal oxide having the spinel-type structure, a metal acetylacetonate in an amount of 1 wt % (0.005 g) relative to the total weight of the particles was added to the mortar, to which water in an amount of 10 wt % (0.05 g) relative to the total weight of the particles was further added, and the materials were well mixed with a pestle. As the metal acetylacetonate, $Zn(acac)_2$, $Ni(acac)_2$, and $Fe(acac)_3$ were prepared such that the mole ratio Zn:Ni:Fe was consistent with the stoichiometric ratio 0.5:0.5:2 in the metal oxide of the particles and the total of these metal acetylacetonates was 1 wt % relative to the total weight of the particles. With these procedures, a raw material mixture was prepared that contained the plurality of particles of the metal oxide having the spinel-type structure, the metal acetylacetonate, and the water. The resultant raw material mixture was charged into a mold that was generally used for pressure molding and had a diameter of 7 mm, and the raw material mixture charged into the mold was pressed by a pressing machine up to 500 MPa with the raw material mixture sandwiched between upper and lower heating plates. The temperature of the upper and lower heating plates that sandwiched the raw material mixture charged into the mold was increased to 300° C. to heat the raw material mixture. After an elapse of 30 minutes at these pressure and temperature, the heating was finished, and the sintered body was naturally air-cooled, extracted from the mold when lowered to 100° C. or lower, and evaluated.

The evaluation was performed as follows. The resultant sintered body was measured for its volume (cm$^2$) using an electronic caliper and for its weight (g) using an electronic balance, and the obtained weight value was divided by volume value to calculate the density (g/cm$^2$) of the sintered body. The density calculated by the present calculation method was obtained in no consideration of, for example, open pores on a surface of the sintered body, and therefore, the calculated density was compared to the apparent density obtained by the Archimedes method to confirm that the measurement error was within an allowance. The calculated density was divided by the theoretical density of the used metal oxide ($Zn_{0.5}Ni_{0.5}Fe_2O_4$ in the present example) to give a ratio (%) of the density of the sintered body to the theoretical density in Example 1-1. Table 2 shows the result. As the theoretical density of $Zn_{0.5}Ni_{0.5}Fe_2O_4$, the literature value 5.378 g/cm$^2$ was employed.

With reference to Table 2, a sintered body was obtained in Example 1-2 by the same method as in Example 1-1 except that the addition amount of the metal acetylacetonate was changed from 1 wt % to 10 wt %. In Example 1-3, a sintered body was obtained by the same method as in Example 1-2 except that water was not used as an additive. The obtained sintered bodies were evaluated in the same manner as described above. Table 2 shows the result.

TABLE 2

|  | Particles of metal oxide | Additive | Heating temperature (° C.) | Ratio of density of sintered body to theoretical density (%) |
|---|---|---|---|---|
| Example 1-1 | $Zn_{0.5}Ni_{0.5}Fe_2O_4$ 0.5 g | Metal acac 0.005 g (1 wt %) + water 0.05 g (10 wt %) | 300 | 72.2 |
| Example 1-2 |  | Metal acac 0.05 g (10 wt %) + water 0.05 g (10 wt %) | 300 | 81.5 |
| Example 1-3 |  | Metal acac 0.05 g (10 wt %) | 300 | 81.3 |

The metal acetylacetonate used in Examples 1-1 to 1-3 was understood from Table 1 to have a melting point of 230° C., the heating was performed at a temperature of such a melting point or higher and 600° C. or lower in any of Examples 1-1 to 1-3, and it was confirmed that the sintered bodies were obtained that had ratios of their density to the theoretical density of more than 70%. Example 1-1 where the sintering temperature was set at 300° C. and the metal acetylacetonate was added in an amount of 0.005 g (1 wt % relative to the total weight of the particles of the metal oxide) gave a high-density sintered body having a ratio of its density to the theoretical density of more than 70%. Further, Example 1-2 where the sintering temperature was set at 300° C. and the metal acetylacetonate was added in an amount of 0.05 g (10 wt % relative to the total weight of the particles of the metal oxide) gave a high-density sintered body having a ratio of its density to the theoretical density of more than 80%. Further, Example 1-3 clarified that even the case where water is not positively added also gives a sintered body having a density of more than 80%. In addition, Examples 1-1 and 1-2 that employed the raw material mixture containing water gave sintered bodies having higher strength than the sintered body obtained in Example 1-3 that employed the raw material mixture containing no water, and this fact confirmed that the presence of water improves the strength of the sintered body.

Comparative Examples 1

A sintered body (green compact) was obtained by the same method as in Example 1-1 except that with reference to Comparative Example 1-1 in Table 3, 0.5 g of particles of a metal oxide having the composition $Zn_{0.5}Ni_{0.5}Fe_2O_4$ as the plurality of particles of the metal oxide having the spinel-type structure were directly used as a raw material without adding the metal acetylacetonate and water to the particles. Further, with reference to Comparative Example 1-2 to 1-5 in Table 3, in a mortar were put 0.5 g of particles of a metal oxide having the composition $Zn_{0.5}Ni_{0.5}Fe_2O_4$ as the plurality of particles of the metal oxide having the spinel-type structure, each solvent was added to the mortar so as to make the particles clayey (about 10 wt % (0.05 g) relative to the total weight of the particles), and the materials were well mixed with a pestle. Comparative Examples 1-2 to 1-5 employed, as the solvent, 1 M of an acetic acid aqueous solution, 0.5 M of an EDTA aqueous solution, acetylacetone, and 0.4 M of an aqueous sol-gel solution, respectively. The 0.4 M of the aqueous sol-gel solution was prepared from 0.4 M of a $Ni(NO_3)_2$ aqueous solution, 0.8 M of a $Fe(NO_3)_2$ aqueous solution, and water. Comparative Example 1-6 employed, as the solvent, the same metal acetylacetonate and water as in Example 1-2. With these procedures, a raw material mixture was prepared that contained the plurality of particles of the metal oxide having the spinel-type structure, and the solvent. A sintered body was obtained by the same method as in Example 1-1 except that the resultant raw material mixture was used and the sintering temperature was appropriately changed as indicated in Table 3 (set at a temperature of the boiling point or higher of the solvent or the melting point or higher of a component contained in the solvent). The obtained sintered bodies were evaluated in the same manner as described above. Table 3 shows the results.

TABLE 3

| | Particles of metal oxide | Additive | Heating temperature (° C.) | Ratio of density of sintered body to theoretical density (%) |
|---|---|---|---|---|
| Comparative Example 1-1 | $Zn_{0.5}Ni_{0.5}Fe_2O_4$ 0.5 g | None | 300 | 63.4 |
| Comparative Example 1-2 | $Zn_{0.5}Ni_{0.5}Fe_2O_4$ 0.5 g | 1M Acetic acid aqueous solution | 120 | 63.5 |
| Comparative Example 1-3 | $Zn_{0.5}Ni_{0.5}Fe_2O_4$ 0.5 g | 0.5M EDTA aqueous solution | 200 | 54.7 |
| Comparative Example 1-4 | $Zn_{0.5}Ni_{0.5}Fe_2O_4$ 0.5 g | Acetylacetone | 200 | 65.1 |
| Comparative Example 1-5 | $Zn_{0.5}Ni_{0.5}Fe_2O_4$ 0.5 g | 0.4M Aqueous sol-gel solution | 300 | 65.2 |
| Comparative Example 1-6 | $Zn_{0.5}Ni_{0.5}Fe_2O_4$ 0.5 g | Metal acac 0.05 g (10 wt %) + water 0.05 g (10 wt %) | 200 | 66.4 |

Comparative Example 1-1 where only the particles of the metal oxide were sintered independently gave a sintered body not exceeding a ratio of its density to the theoretical density of 70%. Any of the sintered bodies obtained in Comparative Examples 1-2 to 1-5 did not exceed a ratio of its density to the theoretical density of 70%. Comparative Example 1-6 where the heating temperature was lower than the melting point of the acetylacetonate also gave a sintered body not exceeding a ratio of its density to the theoretical density of 70% and was incapable of giving a substantially high-density sintered body. The various solvents and the heating temperatures employed in Comparative Examples 1-1 to 1-5 are those employed in Patent Document 1 as prior art, for attaining a high-density sintered body by sintering particles of a metal oxide having, for example, a perovskite-type structure and a wurtzite-type structure at a low temperature. The use of these solvents and heating temperatures was, as described above, incapable of giving the effect to the particles of the metal oxide having the spinel-type structure. This is considered to be because the particles of the metal oxide having the spinel-type structure were not dissolved in acidic aqueous solutions such as the 1 M of the acetic acid aqueous solution or in basic aqueous solutions such as the 0.5 M of the EDTA aqueous solution. This is also considered to be because the particles of the metal oxide having the spinel-type structure have very low solubility in acetylacetone. The metal oxide having the spinel-type structure is synthesized from an aqueous sol-gel solution by a sol-gel method, but even the use of the 0.4 M of the aqueous sol-gel solution showed no effect.

Examples 2 and Comparative Examples 2

With reference to Example 2-1 in Table 4, in a mortar were put 0.5 g of particles of a metal oxide having the composition $NiMn_2O_4$ (MNO) as the plurality of particles of the metal oxide having the spinel-type structure, a metal acetylacetonate in an amount of 10 wt % (0.05 g) relative to the total weight of the particles was added to the mortar, to which water in an amount of 10 wt % (0.05 g) relative to the total weight of the particles was further added, and the materials were well mixed with a pestle. As the metal acetylacetonate, Ni(acac)$_2$ and Mn(acac)$_3$ were added such that the mole ratio Ni:Mn was consistent with the stoichiometric ratio 1:2 in the metal oxide of the particles and the total of these metal acetylacetonates was 10 wt % relative to the total weight of the particles. With these procedures, a raw material mixture was prepared that contained the plurality of particles of the metal oxide having the spinel-type structure, the metal acetylacetonate, and the water. A sintered body was obtained with use of the resultant raw material mixture by the same method as in Example 1-1. A sintered body (green compact) was obtained by the same method as in Example 2-1 except that with reference to Comparative Example 2-1 in Table 4, 0.5 g of particles of a metal oxide having the composition NiMn$_2$O$_4$ (MNO) as the plurality of particles of the metal oxide having the spinel-type structure were directly used as a raw material without adding the metal acetylacetonate to the particles.

Further, with reference to Example 2-2 in Table 4, in a mortar were put 0.5 g of particles of a metal oxide having the composition LiNi$_{0.5}$Mn$_{1.5}$O$_4$ (LNMO) as the plurality of particles of the metal oxide having the spinel-type structure, a metal acetylacetonate in an amount of 10 wt % (0.05 g) relative to the total weight of the particles was added to the mortar, to which water in an amount of 10 wt % (0.05 g) relative to the total weight of the particles was further added, and the materials were well mixed with a pestle.

As the metal acetylacetonate aqueous solution, Li(acac), Ni(acac)$_2$, and Mn(acac)$_3$ were added such that the mole ratio Li:Ni:Mn was consistent with the stoichiometric ratio 1:0.5:1.5 in the metal oxide of the particles and the total of these metal acetylacetonates was 1 wt % relative to the total weight of the particles. With these procedures, a raw material mixture was prepared that contained the plurality of particles of the metal oxide having the spinel-type structure, the metal acetylacetonate, and the water. A sintered body was obtained with use of the resultant raw material mixture by the same method as in Example 1-1. A sintered body (green compact) was obtained by the same method as in Example 2-2 except that with reference to Comparative Example 2-2 in Table 4, 0.5 g of particles of a metal oxide having the composition LiNi$_{0.5}$Mn$_{1.5}$O$_4$ (LNMO) as the plurality of particles of the metal oxide having the spinel-type structure were directly used as a raw material without adding the metal acetylacetonate and water to the particles.

The resultant sintered bodies were evaluated in the same manner as described above in Example 1-1, and a ratio (%) of the density of the sintered body to the theoretical density was obtained in Examples 2-1 and 2-2 and Comparative Examples 2-1 and 2-2. As the theoretical density of NiMn$_2$O$_4$ and the theoretical density of LiNi$_{0.5}$Mn$_{1.5}$O$_4$, the literature value 5.134 g/cm$^2$ and the calculated value 4.7 g/cm$^2$ were employed, respectively. LNMO has less literature values, so that the calculated value was used. Table 4 shows the results.

TABLE 4

| | Particles of metal oxide | Additive | Heating temperature (° C.) | Ratio of density of sintered body to theoretical density (%) |
|---|---|---|---|---|
| Example 2-1 | NiMn$_2$O$_4$ (MNO) 0.5 g | Metal acac 0.05 g (10 wt %) + water 0.05 g (10 wt %) | 300 | 83.8 |
| Comparative Example 2-1 | NiMn$_2$O$_4$ (MNO) 0.5 g | None | 300 | 67.9 |
| Example 2-2 | LiNi$_{0.5}$Mn$_{1.5}$O$_4$ (LNMO) 0.5 g | Metal acac 0.05 g (10 wt %) + water 0.05 g (10 wt %) | 300 | 80.6 |
| Comparative Example 2-2 | LiNi$_{0.5}$Mn$_{1.5}$O$_4$ (LNMO) 0.5 g | None | 300 | 69.0 |

The metal acetylacetonate used in Example 2-1 and Comparative Example 2-1 was understood from Table 1 to have a melting point of 230° C., and the metal acetylacetonate used in Examples 2-2 and Comparative Example 2-2 was understood from Table 1 to have a melting point of 250° C. In both Examples 2-1 and 2-2, the heating was performed at a temperature of 300° C. that was each of the melting points or higher and 600° C. or lower, and the examples were confirmed to give sintered bodies having ratios of their density to the theoretical density of more than 80%. On the other hand, Comparative Examples 2-1 and 2-2 gave sintered bodies having low ratios of their density to the theoretical density, even manufactured at the same heating temperature 300° C., due to the absence of the metal acetylacetonate.

Figure 3:
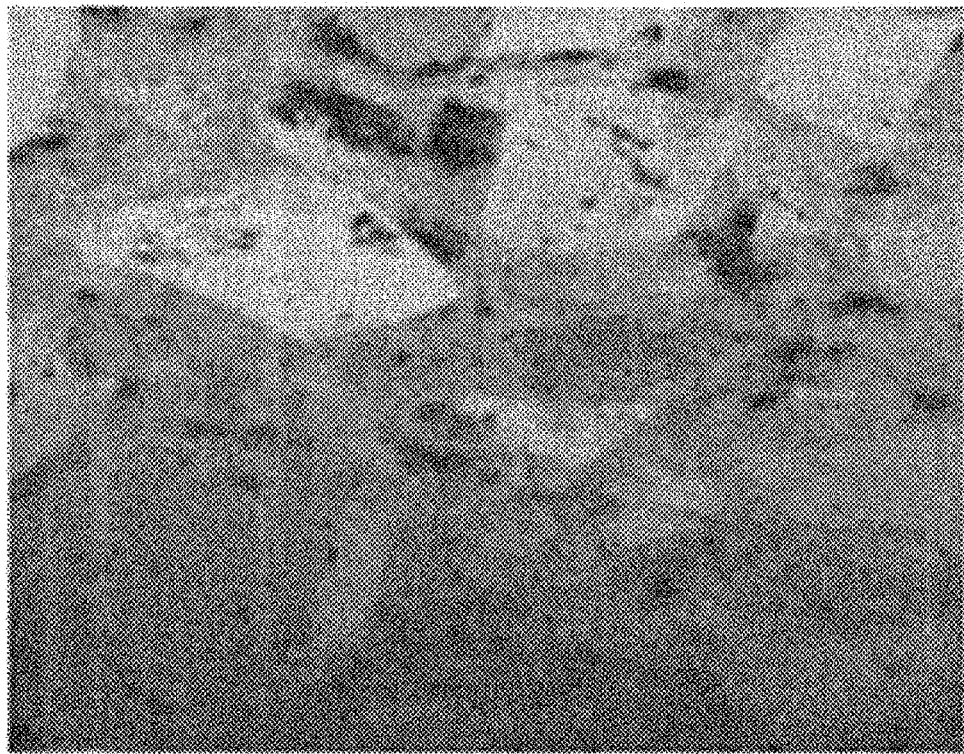
FIG. 3 is a STEM observation image (bright-field image) of a sintered body manufactured according to the present invention.
Figure 4:
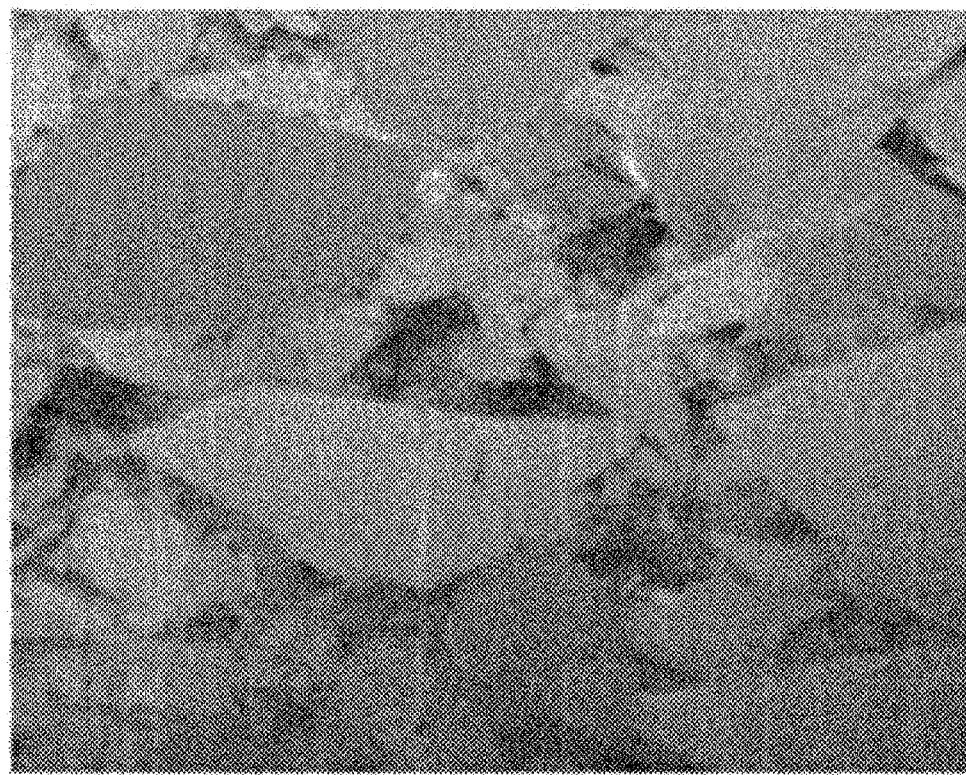
FIG. 4 is a STEM observation image (bright-field image) of a sintered body manufactured according to the present invention.

Further, slices were formed, with an accumulated ion beam (FIB), from the sintered bodies in Examples 2-1 and 2-2 that were obtained with use of MNO or LNMO, the metal acetylacetonate, and water, and the resultant slices were observed using a scanning transmission electron microscope (STEM). FIGS. 3 and 4 show bright-field images by the STEM observation that show fine configurations of the observed sintered bodies of Examples 2-1 and 2-2.

Further, the sintered body obtained in Example 2-1 was measured for its electric resistivity by a four-terminal method, and the result was 100 kΩcm. This numerical value is sufficiently low compared to a numerical value of a powder green compact and is a value that can allow the sintered body to sufficiently function as a part of a component disposed on a resin base material (resin substrate). Further, the sintered body obtained in Example 2-1 had a B-constant, which represented sensitivity of a thermistor to a change in temperature, of 4000, and had excellent sensitivity to a change in temperature.

Example 3

With reference to Example 3-1 in Table 5, in a mortar were put 0.9 g of 3% Si-containing Fe as a magnetic material and 0.1 g of particles of a metal oxide having the composition Zn$_{0.5}$Ni$_{0.5}$Fe$_2$O$_4$ as the plurality of particles of the metal oxide having the spinel-type structure, a metal acetylacetonate in an amount of 10 wt % (0.01 g) relative to the total weight of the particles of the metal oxide was added to the mortar, to which water in an amount of 10 wt % (0.01 g) relative to the total weight of the particles of the metal oxide was further added, and the materials were well mixed with a pestle. As the metal acetylacetonate, Zn(acac)$_2$, Ni(acac)$_2$, and Fe(acac)$_3$ were prepared such that the mole ratio Zn:Ni:Fe was consistent with the stoichiometric ratio 0.5:0.5:2 in the metal oxide of the particles and the total of these metal acetylacetonates was 10% by weight relative to the total weight of the particles. With these procedures, a raw material mixture was prepared that contained the plurality of particles of the metal oxide having the spinel-type structure, the metal acetylacetonate, and the water. A sintered body was obtained with use of the resultant raw material mixture by the same method as in Example 1-1. In a course of calculating the theoretical density of the sintered body, the literature value 5.2 g/cm$^2$ was employed as the theoretical density of LiNi$_{0.5}$Mn$_{1.5}$O$_4$, and the literature value 7.874 g/cm$^2$ of pure Fe was employed as the theoretical density of iron. Table 5 shows the result.

TABLE 5

| | Particles of metal oxide | Magnetic material | Additive | Heating temperature (° C.) | Ratio of density of sintered body to theoretical density (%) |
|---|---|---|---|---|---|
| Example 3-1 | Zn$_{0.5}$Ni$_{0.5}$Fe$_2$O$_4$ 0.1 g | 3% Si-containing Fe 0.9 g | Metal acac 0.01 g (10 wt %) + water 0.01 g (10 wt %) | 300 | 81.2 |

Example 3-1 gave a sintered body (a composite of a metal material and a metal oxide) showing a ratio of its density to the theoretical density of more than 80%, the sintered body being obtained by using the magnetic material as a metal material and sintering the mixture containing the magnetic material together with the plurality of particles of the metal oxide having the spinel-type structure, the metal acetylacetonate, and water. Even a raw material mixture containing a magnetic material as the metal material was clarified to give a high-density sintered body.

Figure 5:
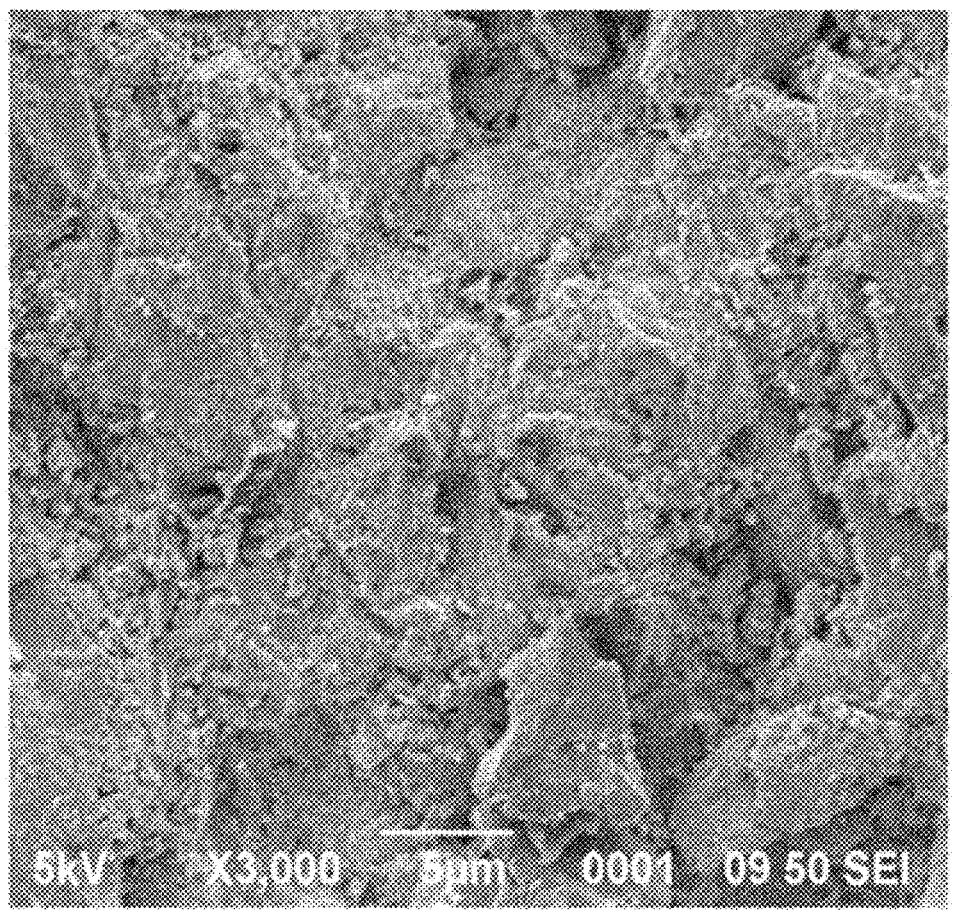
FIG. 5 is a SEM observation image of a sintered body manufactured according to the present invention.

Further, the sintered body obtained in Example 3-1 was observed for its fracture surface using a scanning electron microscope (SEM). FIG. 5 shows an image by the SEM observation that shows a fine configuration of the observed sintered body of Example 3-1.

Examples 4 and Comparative Example 4

In Example 4-1, a raw material mixture was prepared with use of the same raw materials in the same amounts as in Example 2-1 as indicated in Table 6 below and by a method including procedures under the same conditions as in Example 2-1, the raw material mixture containing a plurality of particles of a metal oxide that has a spinel-type structure (0.5 g of NiMn$_2$O$_4$ (MNO)), and a metal acetylacetonate (10 wt % (0.05 g) of Ni(acac)$_2$ and Mn(acac)$_3$) An appropriate amount of an organic solvent was added and well mixed in the raw material mixture to prepare a raw material mixture paste. With the resultant raw material mixture paste, screen printing was performed on a 10-μm thick polyimide base material. The polyimide base material on which the printing was performed with the raw material mixture paste was dried using an oven at 100° C. for 24 hours to evaporate the organic solvent and thereafter left to stand still in a humidified atmosphere for 30 minutes to allow the raw material mixture and the polyimide base material to contain moisture. The raw material mixture and the polyimide base material having the raw material mixture applied thereto were pressed by a pressing machine at 500 MPa with the raw material mixture and the polyimide base material sandwiched between upper and lower heating plates set at 300° C. These procedures gave a composite structure that included a structure containing the metal oxide, and the polyimide base material.

In Example 4-2, a composite structure was obtained that included a structure containing a metal oxide, and an Al foil base material by employing, as indicated in Table 6, the same method as in Example 4-1 except that a 10-μm thick Al foil base material was used in place of the 10-μm thick polyimide base material.

In Example 4-3, a composite structure was obtained that included a structure containing a metal oxide, and a polyimide base material by employing, as indicated in Table 6, the same method as in Example 4-1 except that a raw material mixture (0.5 g of Zn$_{0.5}$Ni$_{0.5}$Fe$_2$O$_4$ (ZNFO) and 0.05 g (10 wt %) of Zn(acac)$_2$, Ni(acac)$_2$, and Fe(acac)$_3$) prepared by the method in Example 1-2 was used in place of the raw material mixture prepared by the method in Example 2-1.

In Comparative Example 4-1, a sintered body obtained by the same method as in Example 2-1 was, as indicated in Table 6, brought into contact with a 10-μm thick polyimide base material and pressed by a pressing machine at 500 MPa with the sintered body and the polyimide base material sandwiched between upper and lower heating plates set at 300° C. These procedures gave a composite structure that included a structure containing the metal oxide, and the polyimide base material.

TABLE 6

| | Particles of metal oxide | Additive | Base material | Note |
|---|---|---|---|---|
| Example 4-1 | NiMn$_2$O$_4$ (MNO) 0.5 g | aacac 0.05 g (10 wt %) | Polyimide | Printing on base material with raw material mixture, followed by pressure heating |
| Example 4-2 | NiMn$_2$O$_4$ (MNO) 0.5 g | acac 0.05 g (10 wt %) | Al foil | Printing on base material with raw material mixture, followed by pressure heating |

TABLE 6-continued

| | Particles of metal oxide | Additive | Base material | Note |
|---|---|---|---|---|
| Example 4-3 | $Zn_{0.5}Ni_{0.5}Fe_2O_4$ (ZNFO) 0.5 g | acac 0.05 g (10 wt %) | Polyimide | Printing on base material with raw material mixture, followed by pressure heating |
| Comparative Example 4-1 | $NiMn_2O_4$ (MNO) 0.5 g | acac 0.05 g (10 wt %) | Polyimide | Production of sintered body, followed by pressure heating of sintered body and polyimide |

The composite structures obtained in Examples 4-1 to 4-3 included the metal oxide-containing structure portion and the polyimide or Al foil base material portion that were strongly joined to each other, and even when subjected to a tape peeling test defined in JIS, the composite structures showed no peeling. On the other hand, Comparative Example 4-1 gave a composite structure including a polyimide base material portion plastically deformed by the pressure heating and attached to the structure obtained by the method in Example 2-1. The adhesion strength was weak, and when subjected to the tape peeling test, the composite structure showed peeling.

Further, a slice that enabled observation of a section perpendicular to the joining portion was produced with use of an accumulated ion beam (FIB) from each of the composite structure samples in Examples 4-1 to 4-3 and Comparative Example 4-1. In order to confirm, in the obtained each slice, the disposition of the particles of the metal oxide, the appearance of the amorphous phase, and the state of diffusion of an element derived from the base material, the slice was observed using a scanning transmission electron microscope (STEM). FIGS. 7A to 10D each show a STEM observation image obtained.

Figure 7A:
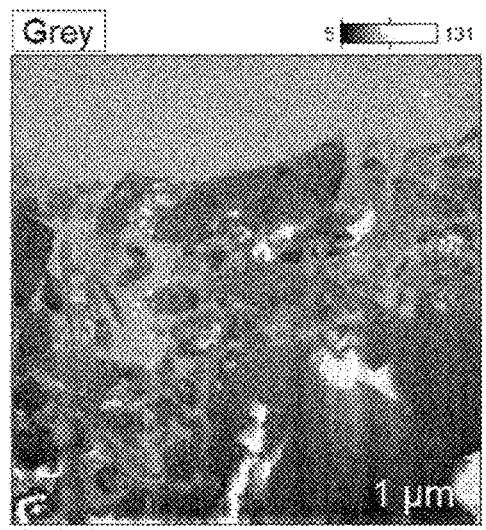
FIG. 7A is a STEM observation image (bright-field image) of one example of the composite structure according to the present invention.
Figure 7B:
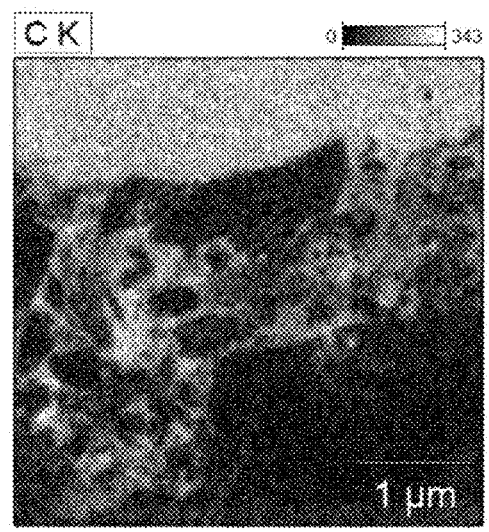
FIG. 7B is a STEM observation image (bright-field image) of the one example of the composite structure according to the present invention.
Figure 7C:
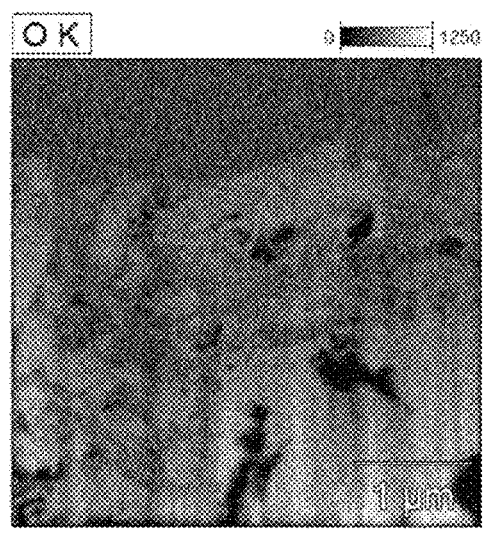
FIG. 7C is a STEM observation image (bright-field image) of the one example of the composite structure according to the present invention.
Figure 7D:
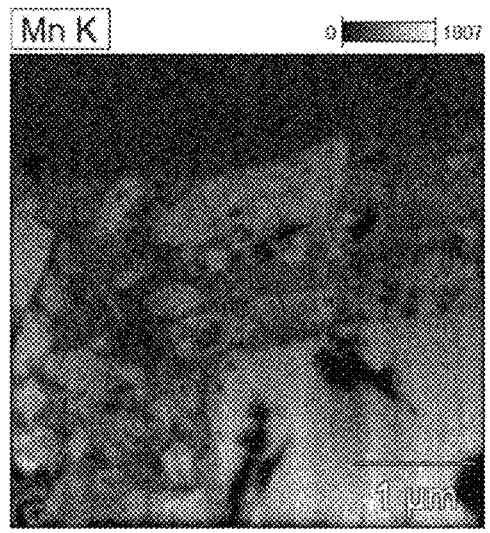
FIG. 7D is a STEM observation image (bright-field image) of the one example of the composite structure according to the present invention.

FIG. 7A is a STEM observation image showing the section of the composite structure in Example 4-1. FIG. 7B shows a distribution of the element C (carbon) in FIG. 7A. FIG. 7C shows a distribution of the element O (oxygen) in FIG. 7A. FIG. 7D shows a distribution of the element Mn (manganese) in FIG. 7A. As clarified by FIGS. 7A to 7D, the composite structure of Example 4-1 was observed to have diffusion of the element C derived from the polyimide base material and diffusion of the element O and the element Mn derived from the metal oxide in an amorphous phase-containing joining layer (near the center of the images) between the metal oxide-containing structure portion and the polyimide base material portion. Further, the element O and the element Mn derived from the metal oxide were observed to be diffused also into the polyimide base material portion (near an upper portion of the images).

Figure 8A:
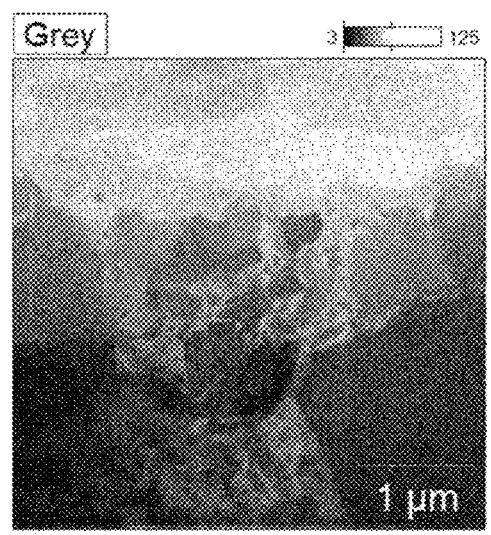
FIG. 8A is a STEM observation image (bright-field image) of one example of the composite structure according to the present invention.
Figure 8B:
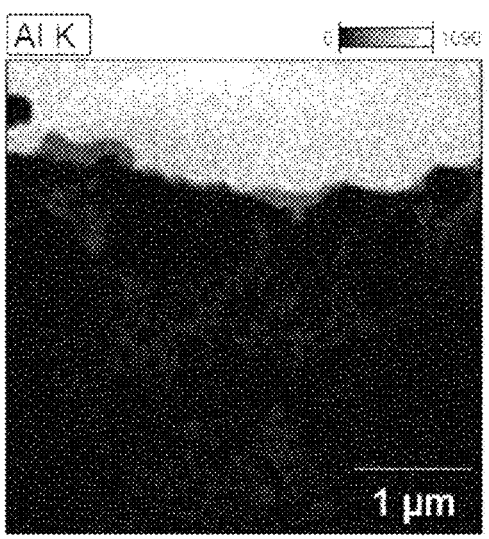
FIG. 8B is a STEM observation image (bright-field image) of the one example of the composite structure according to the present invention.
Figure 8C:
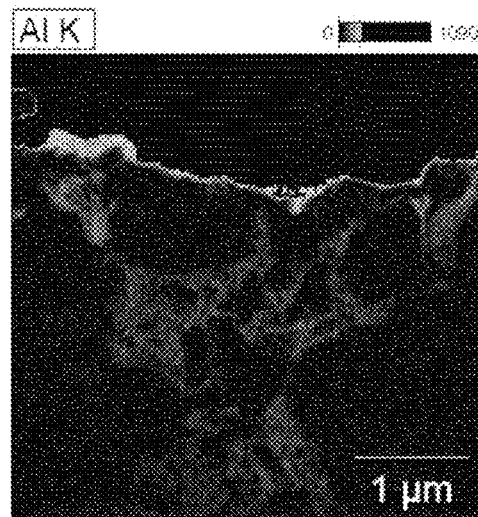
FIG. 8C is a STEM observation image (bright-field image) of the one example of the composite structure according to the present invention.
Figure 8D:
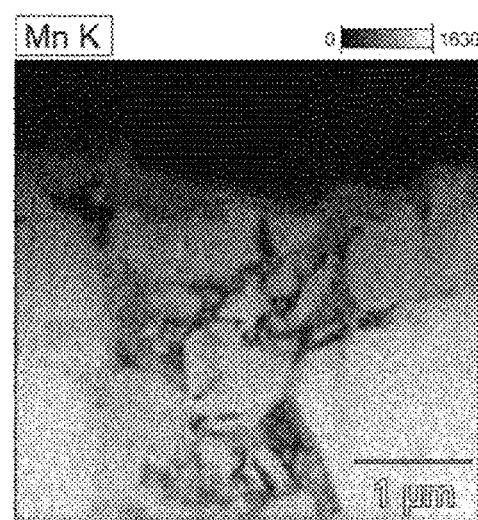
FIG. 8D is a STEM observation image (bright-field image) of the one example of the composite structure according to the present invention.

FIG. 8A is a STEM observation image showing the section of the composite structure in Example 4-2. FIG. 8B shows a distribution of the element Al (aluminum) in FIG. 8A. FIG. 8C shows only low concentration in the distribution of the element Al in FIG. 8B. FIG. 8D shows a distribution of the element Mn in FIG. 8A. As clarified by FIGS. 8A to 8D, the composite structure of Example 4-2 was observed to have diffusion of the element Al derived from the Al foil base material and diffusion of the element Mn derived from the metal oxide in an amorphous phase-containing joining layer (near the center of the images) between the metal oxide-containing structure portion and the Al foil base material portion. Unlike Example 4-1, however, the element Mn derived from the metal oxide was not observed to be diffused into the Al foil base material portion (near an upper portion of the images).

Figure 9A:
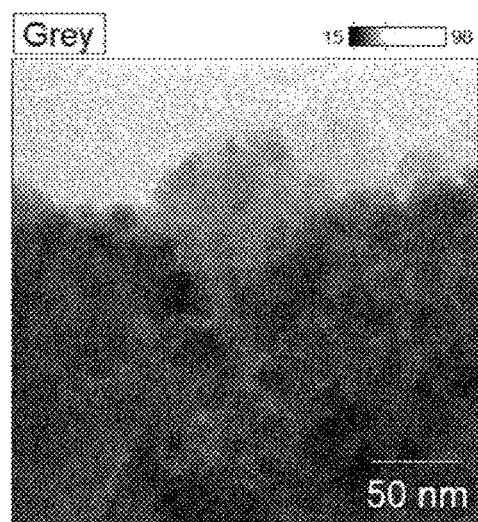
FIG. 9A is a STEM observation image (bright-field image) of one example of the composite structure according to the present invention.
Figure 9B:
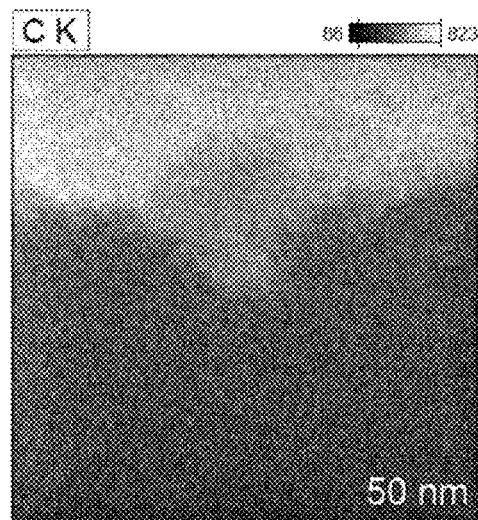
FIG. 9B is a STEM observation image (bright-field image) of the one example of the composite structure according to the present invention.
Figure 9C:
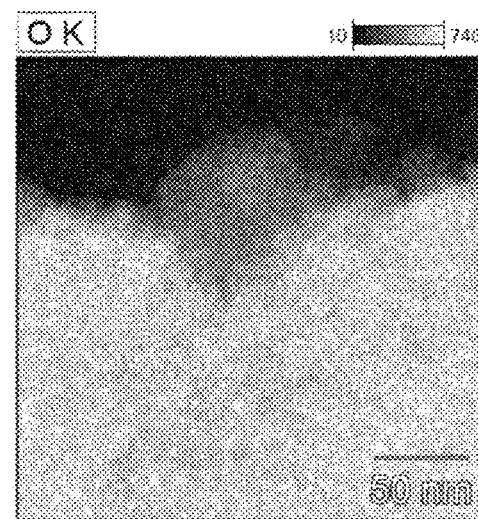
FIG. 9C is a STEM observation image (bright-field image) of the one example of the composite structure according to the present invention.
Figure 9D:
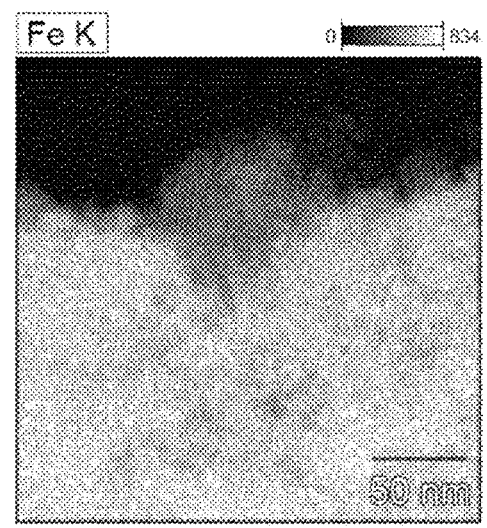
FIG. 9D is a STEM observation image (bright-field image) of the one example of the composite structure according to the present invention.

FIG. 9A is a STEM observation image showing the section of the composite structure in Example 4-3. FIG. 9B shows a distribution of the element C (carbon) in FIG. 9A. FIG. 9C shows a distribution of the element O (oxygen) in FIG. 9A. FIG. 9D shows a distribution of the element Fe (iron) in FIG. 9A.

As clarified by FIGS. 9A to 9D, the composite structure of Example 4-3 was observed to have diffusion of the element C derived from the polyimide base material and diffusion of the element O and the element Fe derived from the metal oxide in an amorphous phase-containing joining layer (near the center of the images) between the metal oxide-containing structure portion and the polyimide base material portion. Diffusion of the element O and the element Fe derived from the metal oxide into the polyimide base material portion (near an upper portion of the images) was unclear because the STEM observation images were confirmed at a high magnification.

Figure 10A:
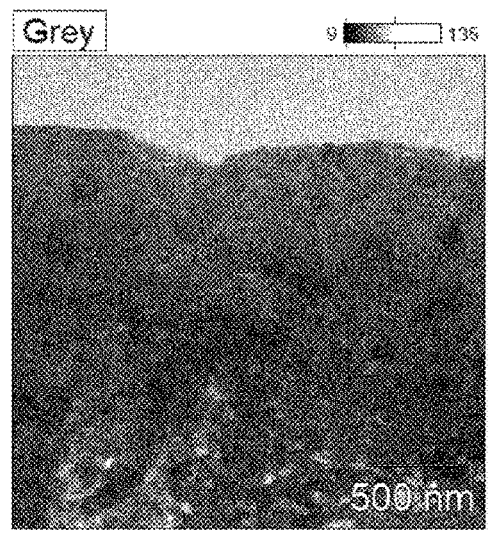
FIG. 10A is a STEM observation image (bright-field image) of a comparative example of the composite structure according to the present invention.

FIG. 10A is a STEM observation image showing the section of the composite structure in Comparative Example 4-1.

Figure 10B:
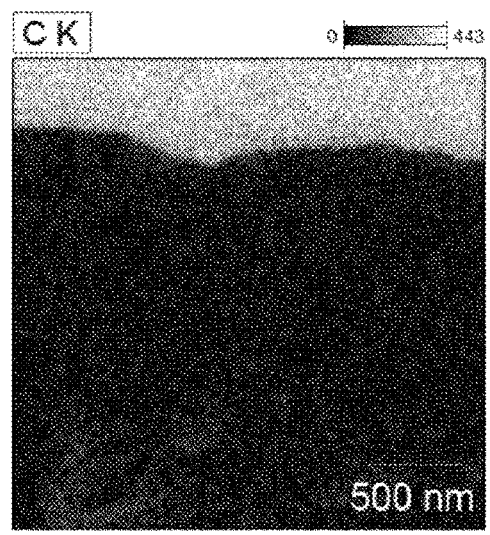
FIG. 10B is a STEM observation image (bright-field image) of the comparative example of the composite structure according to the present invention.
Figure 10C:
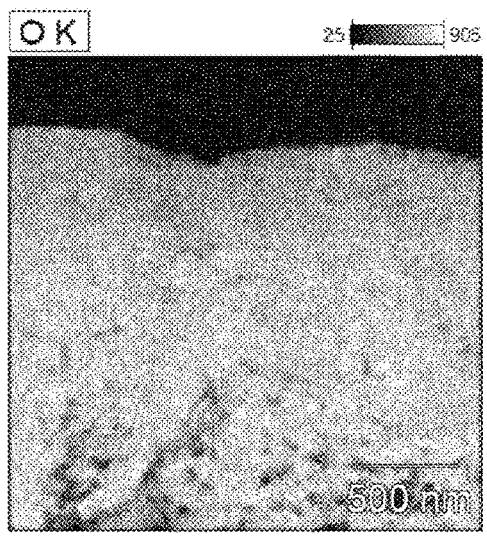
FIG. 10C is a STEM observation image (bright-field image) of the comparative example of the composite structure according to the present invention.
Figure 10D:
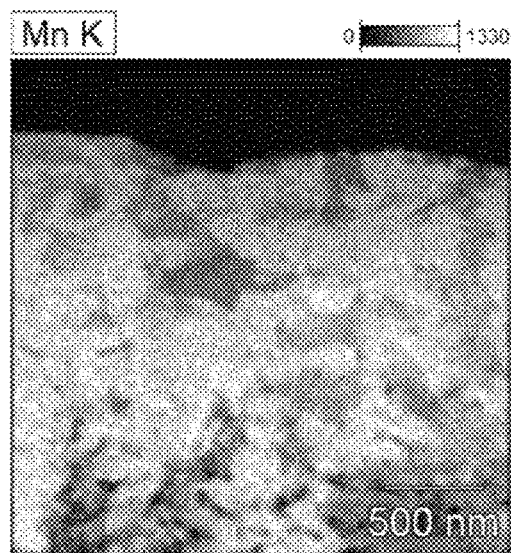
FIG. 10D is a STEM observation image (bright-field image) of the comparative example of the composite structure according to the present invention.

FIG. 10A is a STEM observation image showing the section of the composite structure in Comparative Example 4-1. FIG. 10B shows a distribution of the element C (carbon) in FIG. 10A. FIG. 10C shows a distribution of the element O (oxygen) in FIG. 10A. FIG. 10D shows a distribution of the element Mn (manganese) in FIG. 10A. Unlike Examples 4-1 to 4-3 and as clarified by FIGS. 10A to 10D, however, the composite structure of Comparative Example 4-1 was not observed to have diffusion of the element C derived from the polyimide base material between the metal oxide-containing structure portion and the polyimide base material portion (near the center of the images).

In consideration of these results, when diffusion of an element derived from the base material is, in such a composite structure, not observed between the metal oxide-containing structure portion and the base material portion, the amorphous phase-containing joining layer is not considered to be present, and this fact clarifies that such a composite structure has weak adhesion strength and is likely to cause peeling.

(Identification of Amorphous Phase)

Figure 11A:
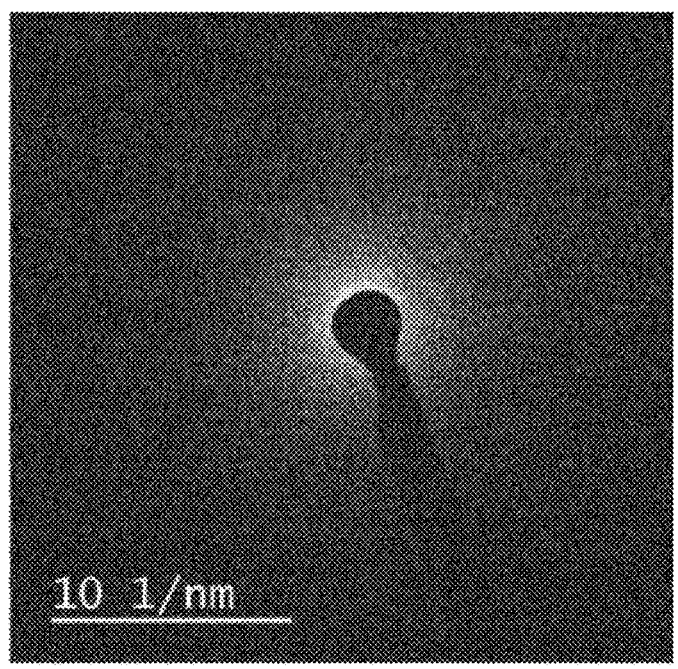
FIG. 11A is an electron diffraction image related to identification of an amorphous phase in the present invention.
Figure 11B:
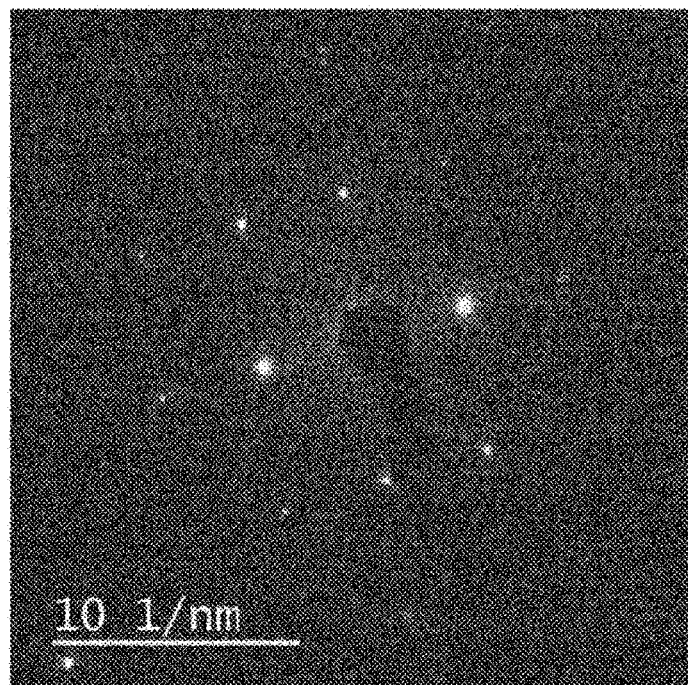
FIG. 11B is an electron diffraction image related to identification of the amorphous phase in the present invention.

On the basis of an electron diffraction image of a slice sample of the composite structure produced in Example 4-1, observation was performed while the amorphous phase was discerned from the particles of the metal oxide having the spinel-type structure. In an electron diffraction image of a portion containing C (see FIG. 7B) and the metal element (Mn) (see FIG. 7D) among sample analysis locations shown in FIGS. 7A to 7D, no diffraction spot (dot) was observed as shown in FIG. 11A. Therefore, such a portion is clarified to be an amorphous phase having no crystal structure. On the other hand, in an electron diffraction image of a portion containing only the metal element (Mn) (see FIG. 7D) of the particles of the metal oxide considered to be derived from the raw material mixture, diffraction spots (dots) were obtained according to the crystallite symmetry of the spinel-type structure as shown in FIG. 11B. Therefore, such a portion is clarified to be a single crystal. In more detail, the appearance positions of diffraction spots (dots) are determined by the crystal structure according to Bragg's law. Crystal plane spacing determines a distance of a diffraction spot from transmitted light, and an orientation of each diffraction spot determines an angle formed between the transmitted light and a connecting line to each diffraction spot. Accordingly, with binarization performed by setting, as a threshold, the exact middle between the blackest portion and the whitest portion of the electron diffraction image, white points present at positions considered from the crystal structure are identified to represent a single crystal (see FIG. 11B), and only a white point present around an original point as the center is identified to represent an amorphous phase (see FIG. 11A). The method for confirming the particles of the metal oxide having the spinel-type structure is a technique known to those skilled in the art because the spinel-type structure is described in, for example, "Structure and properties of inorganic solids" (AGNE Gijutsu Center Inc., 1984) written by F. S. Galasso, the crystal symmetry is described in, for example, "Symmetry in matter and group theory" (Kyoritsu Shuppan Co., Ltd., 2001) written by Toyohiko Konno, and the electron diffraction image of amorphous matter is described in, for example, "Fundamentals of diffraction from matter and its imaging" (Kyoritsu Shuppan Co., Ltd., 2003) written by Toyohiko Konno.

A method for forming a sintered body according to the present invention is usable for a wide range of various applications where a sintered body that contains a metal oxide having a spinel-type structure can be used, and the method can, without limiting the present invention, be utilized in a method for manufacturing, for example, a ferrite material for a coil, an inductor, or the like, an NTC thermistor material, or a positive electrode material for a lithium ion battery.

DESCRIPTION OF REFERENCE SYMBOLS

1: Particle
2, 2': Amorphous phase
11: Large particle
12: Small particle
13: Base material element
100: Structure
200: Joining layer
300: Base material

The invention claimed is:

1. A method for manufacturing a sintered body, the method comprising:
   mixing a plurality of particles of at least one metal oxide having a spinel-type structure with at least one metal acetylacetonate to produce a mixture; and
   heating the mixture in the presence of water or water vapor and under pressure and at a temperature of from a melting point or higher of the at least one metal acetylacetonate to 600° C. or lower,
   wherein the water or water vapor is present in the mixture in an amount such that there is 20 wt % or less of water relative to a total weight of the plurality of particles of the at least one metal oxide having the spinel-type structure.

2. The method according to claim 1, wherein the metal acetylacetonate contains a metal element that is the same as at least one metal element contained in the metal oxide.

3. The method according to claim 1, wherein the mixture further contains at least one of a metal material, a resin material, or a carbon material.

4. The method according to claim 1, wherein the metal oxide is ferrite.

5. The method according to claim 1, wherein the metal oxide contains Ni and Mn.

6. The method according to claim 1, wherein the metal oxide contains one or more of Li, Mg, Al, Cr, Mn, Fe, Co, Ni, Cu, and Zn.

7. The method according to claim 1, wherein the pressure 1 MPa to 5000 MPa.

8. The method according to claim 1, wherein the plurality of particles of the metal oxide include at least two particles having different average particle sizes.

* * * * *